US011675366B2

(12) United States Patent
Galoogahi et al.

(10) Patent No.: US 11,675,366 B2
(45) Date of Patent: Jun. 13, 2023

(54) LONG-TERM OBJECT TRACKING SUPPORTING AUTONOMOUS VEHICLE NAVIGATION

(71) Applicant: MOTIONAL AD LLC, Boston, MA (US)

(72) Inventors: Hamed Kiani Galoogahi, Pittsburgh, PA (US); Caglayan Dicle, Boston, MA (US)

(73) Assignee: Motional AD LLC, Boston, MA (US)

( * ) Notice: Subject to any disclaimer, the term of this patent is extended or adjusted under 35 U.S.C. 154(b) by 8 days.

(21) Appl. No.: 17/124,288

(22) Filed: Dec. 16, 2020

(65) Prior Publication Data

US 2021/0200238 A1    Jul. 1, 2021

Related U.S. Application Data

(60) Provisional application No. 62/954,264, filed on Dec. 27, 2019.

(51) Int. Cl.
*G05D 1/02*    (2020.01)

(52) U.S. Cl.
CPC ......... *G05D 1/0274* (2013.01); *G05D 1/0242* (2013.01); *G05D 1/0257* (2013.01)

(58) Field of Classification Search
None
See application file for complete search history.

(56) References Cited

U.S. PATENT DOCUMENTS

| 9,441,973 | B2 | 9/2016 | Bandyopadhyay et al. |
| 2016/0180197 | A1* | 6/2016 | Kim .......................... G01S 5/16 |
| | | | 382/103 |
| 2017/0316333 | A1* | 11/2017 | Levinson ............... G06N 20/00 |
| 2018/0067491 | A1 | 3/2018 | Oder et al. |
| 2018/0349785 | A1 | 12/2018 | Zheng et al. |
| 2019/0163191 | A1 | 5/2019 | Sorin et al. |
| 2019/0228232 | A1* | 7/2019 | Lécart ................... G08G 1/0175 |
| 2019/0384303 | A1 | 12/2019 | Muller et al. |

FOREIGN PATENT DOCUMENTS

DE    102016203472 A1 *    9/2017

OTHER PUBLICATIONS

Machine translation of DE-102016203472-A1 (Year: 2017).*
Great Britain Office Action issued for Application No. GB 2020548. 0, dated Jul. 22, 2021.
Korean Office Action issued for Application No. KR 10-2020-0183595, dated Jan. 26, 2022.
Korean Office Action issued for Application No. KR 10-2020-0183595, dated Aug. 24, 2022.
SAE On-Road Automated Vehicle Standards Committee, "SAE International's Standard J3016: Taxonomy and Definitions for Terms Related to Driving Automation Systems for On-Road Motor Vehicles", Jun. 2018, in 35 pages.

* cited by examiner

*Primary Examiner* — Anne Marie Antonucci
*Assistant Examiner* — Kyle S Park
(74) *Attorney, Agent, or Firm* — Knobbe, Martens, Olson & Bear, LLP

(57) ABSTRACT

This disclosure relates in general to systems and methods for tracking objects proximate an autonomous vehicle. In particular, an object tracking system capable of re-identifying objects it has temporarily lost line of sight to is described. Re-identification of the objects allows earlier object detections to be used more effectively to predict motion likely to be taken by the objects.

20 Claims, 23 Drawing Sheets

LONG-TERM OBJECT TRACKING SUPPORTING AUTONOMOUS VEHICLE NAVIGATION

CROSS-REFERENCE TO RELATED APPLICATIONS

This application claims the benefit of U.S. Provisional Patent Application No. 62/954,264, filed Dec. 27, 2019, entitled "LONG-TERM OBJECT TRACKING SUPPORTING AUTONOMOUS VEHICLE NAVIGATION," the entire contents of which are hereby incorporated by reference.

FIELD

This description relates to an object tracking system supporting the navigation of an autonomous vehicle.

BACKGROUND

Autonomous vehicles can be used to transport people and/or cargo (e.g., packages, objects, or other items) from one location to another. For example, an autonomous vehicle can navigate to the location of a person, wait for the person to board the autonomous vehicle, and navigate to a specified destination (e.g., a location selected by the person). To navigate in the environment, these autonomous vehicles are equipped with various types of sensors to detect objects in the surroundings.

SUMMARY

While the use of sensors to detect objects proximate the autonomous vehicle is known, improvements in the abilities of the vehicle to detect, continuously track and anticipate future actions of the objects are desirable. The subject matter described in this specification is directed to a computer system and techniques for detecting objects in an environment surrounding an autonomous vehicle. Generally, the computer system is configured to receive input from one or more sensors of the vehicle, detect one or more objects in the environment surrounding the vehicle based on the received input, and operate the vehicle based upon the detection of the objects.

For example, the system can be configured to re-identify objects that have been temporarily concealed or obscured from one or more sensor detections so that previously detected activity taken by that object can be used to more accurately predict behavior of that object. An exemplary method includes: capturing sensor data using a sensor of an autonomous vehicle; detecting, using a processing circuit, an object from the sensor data, wherein detecting the object includes creating detection data; associating, using the processing circuit, the detection data with first tracking data; obtaining, using the processing circuit, second tracking data that meets a stale-track criteria; comparing, using the processing circuit, the first tracking data to the second track data; and in accordance with a determination that the comparison of the first tracking data and the second tracking data meets matching criteria: associating, using the processing circuit, the second tracking data with the first tracking data; and navigating, using a control circuit, the autonomous vehicle based at least in part on the second tracking data.

These and other aspects, features, and implementations can be expressed as methods, apparatuses, systems, components, program products, means or steps for performing a function, and in other ways.

These and other aspects, features, and implementations will become apparent from the following descriptions, including the claims.

DETAILED DESCRIPTION

Figure 1:
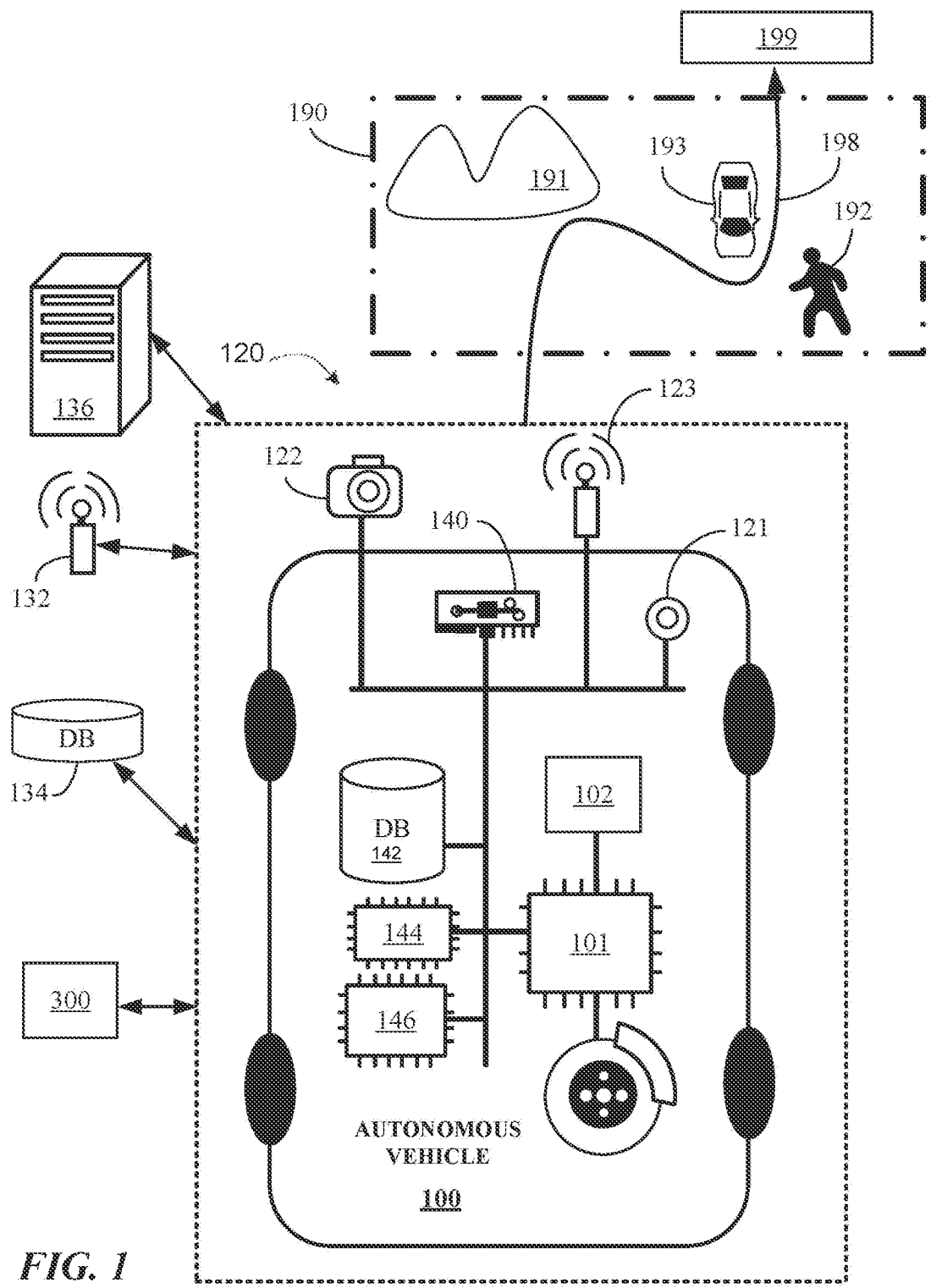
FIG. 1 shows an example of an autonomous vehicle having autonomous capability.

In the following description, for the purposes of explanation, numerous specific details are set forth in order to provide a thorough understanding of the present disclosure. It will be apparent, however, that the disclosed techniques may be practiced without these specific details. In other instances, well-known structures and devices are shown in block diagram form in order to avoid unnecessarily obscuring the disclosed techniques.

In the drawings, specific arrangements or orderings of schematic elements, such as those representing devices, modules, instruction blocks and data elements, are shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in some embodiments.

Further, in the drawings, where connecting elements, such as solid or dashed lines or arrows, are used to illustrate a connection, relationship, or association between or among two or more other schematic elements, the absence of any such connecting elements is not meant to imply that no connection, relationship, or association can exist. In other words, some connections, relationships, or associations between elements are not shown in the drawings so as not to obscure the disclosure. In addition, for ease of illustration, a single connecting element is used to represent multiple connections, relationships or associations between elements. For example, where a connecting element represents a communication of signals, data, or instructions, it should be understood by those skilled in the art that such element represents one or multiple signal paths (e.g., a bus), as may be needed, to affect the communication.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Several features are described hereafter that can each be used independently of one another or with any combination of other features. However, any individual feature may not address any of the problems discussed above or might only address one of the problems discussed above. Some of the problems discussed above might not be fully addressed by any of the features described herein. Although headings are provided, information related to a particular heading, but not found in the section having that heading, may also be found elsewhere in this description. Embodiments are described herein according to the following outline:

1. General Overview
2. Hardware Overview
3. Autonomous Vehicle Architecture
4. Autonomous Vehicle Inputs
5. Autonomous Vehicle Planning
6. Autonomous Vehicle Control
7. Computing System for Object Detection Using Pillars
8. Example Point Clouds and Pillars
9. Example Process for Detecting Objects and Operating the Vehicle Based on the Detection of the Objects General Overview Autonomous vehicles driving in complex environments (e.g., an urban environment) pose a great technological challenge. In order for autonomous vehicles to navigate these environments, the vehicles detect various types of objects such as vehicles, pedestrians, and bikes in real-time using sensors such as optical sensors, LIDAR and/or RADAR. One approach to performing object detection utilizes image analysis to track objects proximate to an autonomous vehicle.

In some embodiments, the system and techniques described herein implement an on-board sensor-based tracking system capable of determining the position of objects surrounding an autonomous vehicle based on a position of the objects captured by one or more sensors mounted to or in close proximity to the autonomous vehicle. A position of the sensor at the time of capture of the images can be known by virtue of location information provided by a satellite-based navigation receiver of the autonomous vehicle. When the one or more sensors are optical sensors and location of the sensor is known at the time of capture, the position of an object within an image provides a line of bearing along which the object is located at the time the image was captured. Prior and/or subsequent detection of the object in additional images allows for further refinement of where the object is located along the line of bearing. In this way, location information for the object can be included in an active track that the autonomous vehicle can reference when navigating the vehicle around the object. It should be noted that other types of sensors such as LiDAR and RADAR can be used in lieu of or in addition to optical/imagery type sensors.

In addition to identifying the location of objects based on one or more types of sensor data, a location of an object can also be refined by referencing previously captured tracking data. By analyzing previously collected tracking data a predicted position of the object can be determined. The predicted position can help in a number of ways. First, the predicted position can help to identify which new object detections should be linked with which active track. For example, a vehicle travelling at a high rate of speed relative to the autonomous vehicle can be located a long distance from its last detected position. By predicting a location of the fast-moving object based on its previously observed rate of travel, new tracks can be matched with predicted locations of the objects to match new and old tracking data. Second, periodic inaccuracies in the tracking data caused by unexpected vibration of the autonomous vehicle and/or temporary instability of the object detection sensor can produce image data that varies substantially from previously collected tracking data. In some embodiments, the detected position and predicted position can be combined to generate a weighted average of the two positions. This can help to reduce the severity of transitory errors resulting from problems during sensor detections. In some embodiments, metadata associated with the sensor detections can include inputs from, e.g., a gyroscope or other motion detection device designed to indicate stabilization issues with the sensor. Third, the predicted position can also be used to help correlate new tracking data with tracking data associated with an older or stale track. In this way, historical data associated with an object can be re-identified to help more accurately predict behavior of an object.

In addition to the benefits described above this system benefits from being able to be applied to multiple different types of objects including moving objects such as cars and trucks as well as stationary objects such as fire hydrants, light polls, buildings and the like. The described embodiments are not necessarily limited to ground-based objects either and could also be applied to vehicles having the capability to travel above the ground or by sea. It should also be noted that the described system can be configured to have a stateless dataflow pipeline that makes it easier to run processes in parallel. This is because at least in part all the state information associated with the tracking data remains with its associated object track.

Hardware Overview

FIG. 1 shows an example of an autonomous vehicle 100 having autonomous capability.

As used herein, the term "autonomous capability" refers to a function, feature, or facility that enables a vehicle to be partially or fully operated without real-time human intervention, including without limitation fully autonomous vehicles, highly autonomous vehicles, and conditionally autonomous vehicles.

As used herein, an autonomous vehicle (AV) is a vehicle that possesses autonomous capability.

As used herein, "vehicle" includes means of transportation of goods or people. For example, cars, buses, trains, airplanes, drones, trucks, boats, ships, submersibles, dirigibles, etc. A driverless car is an example of a vehicle.

As used herein, "trajectory" refers to a path or route to navigate an AV from a first spatiotemporal location to a second spatiotemporal location. In an embodiment, the first spatiotemporal location is referred to as the initial or starting location and the second spatiotemporal location is referred to as the destination, final location, goal, goal position, or goal location. In some examples, a trajectory is made up of one or more segments (e.g., sections of road) and each segment is made up of one or more blocks (e.g., portions of a lane or intersection). In an embodiment, the spatiotemporal locations correspond to real world locations. For example, the spatiotemporal locations are pick up or drop-off locations to pick up or drop-off persons or goods.

As used herein, "sensor(s)" includes one or more hardware components that detect information about the environment surrounding the sensor. Some of the hardware components can include sensing components (e.g., image sensors, biometric sensors), transmitting and/or receiving components (e.g., laser or radio frequency wave transmitters and receivers), electronic components such as analog-to-digital converters, a data storage device (such as a RAM and/or a nonvolatile storage), software or firmware components and data processing components such as an ASIC (application-specific integrated circuit), a microprocessor and/or a microcontroller.

As used herein, a "scene description" is a data structure (e.g., list) or data stream that includes one or more classified or labeled objects detected by one or more sensors on the AV vehicle or provided by a source external to the AV.

As used herein, a "road" is a physical area that can be traversed by a vehicle, and may correspond to a named thoroughfare (e.g., city street, interstate freeway, etc.) or may correspond to an unnamed thoroughfare (e.g., a driveway in a house or office building, a section of a parking lot, a section of a vacant lot, a dirt path in a rural area, etc.). Because some vehicles (e.g., 4-wheel-drive pickup trucks, sport utility vehicles, etc.) are capable of traversing a variety of physical areas not specifically adapted for vehicle travel, a "road" may be a physical area not formally defined as a thoroughfare by any municipality or other governmental or administrative body.

As used herein, a "lane" is a portion of a road that can be traversed by a vehicle, and may correspond to most or all of the space between lane markings, or may correspond to only some (e.g., less than 50%) of the space between lane markings. For example, a road having lane markings spaced far apart might accommodate two or more vehicles between the markings, such that one vehicle can pass the other without traversing the lane markings, and thus could be interpreted as having a lane narrower than the space between the lane markings, or having two lanes between the lane markings. A lane could also be interpreted in the absence of lane markings. For example, a lane may be defined based on physical features of an environment, e.g., rocks and trees along a thoroughfare in a rural area.

"One or more" includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless specified otherwise.

The terminology used in the description of the various described embodiments herein is for the purpose of describing particular embodiments only and is not intended to be limiting. As used in the description of the various described embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

As used herein, an AV system refers to the AV along with the array of hardware, software, stored data, and data generated in real-time that supports the operation of the AV. In an embodiment, the AV system is incorporated within the AV. In an embodiment, the AV system is spread across several locations. For example, some of the software of the AV system is implemented on a cloud computing environment similar to cloud computing environment 200 described below with respect to FIG. 2.

In general, this document describes technologies applicable to any vehicles that have one or more autonomous capabilities including fully autonomous vehicles, highly autonomous vehicles, and conditionally autonomous vehicles, such as so-called Level 5, Level 4 and Level 3 vehicles, respectively (see SAE International's standard J3016: Taxonomy and Definitions for Terms Related to On-Road Motor Vehicle Automated Driving Systems, which is incorporated by reference in its entirety, for more details on the classification of levels of autonomy in vehicles). The technologies described in this document are also applicable to partially autonomous vehicles and driver assisted vehicles, such as so-called Level 2 and Level 1 vehicles (see SAE International's standard J3016: Taxonomy and Definitions for Terms Related to On-Road Motor Vehicle Automated Driving Systems). In an embodiment, one or more of the Level 1, 2, 3, 4 and 5 vehicle systems may automate certain vehicle operations (e.g., steering, braking, and using maps) under certain operating conditions based on processing of sensor inputs. The technologies described in this document can benefit vehicles in any levels, ranging from fully autonomous vehicles to human-operated vehicles.

Referring to FIG. 1, an AV system 120 operates the AV 100 along a trajectory 198 through an environment 190 to a destination 199 (sometimes referred to as a final location) while avoiding objects (e.g., natural obstructions 191, vehicles 193, pedestrians 192, cyclists, and other obstacles) and obeying rules of the road (e.g., rules of operation or driving preferences).

In an embodiment, the AV system 120 includes devices 101 that are instrumented to receive and act on operational commands from the computer processors 146. In an embodiment, computing processors 146 are similar to the processor 304 described below in reference to FIG. 3. Examples of devices 101 include a steering control 102, brakes (not illustrated), gears, accelerator pedal or other acceleration control mechanisms, windshield wipers, side-door locks, window controls, and turn-indicators.

In an embodiment, the AV system 120 includes sensors 121 for measuring or inferring properties of state or condition of the AV 100, such as the AV's position, linear and angular velocity and acceleration, and heading (e.g., an orientation of the leading end of AV 100). Example of sensors 121 are GPS, inertial measurement units (IMU) that measure both vehicle linear accelerations and angular rates, wheel speed sensors for measuring or estimating wheel slip ratios, wheel brake pressure or braking torque sensors, engine torque or wheel torque sensors, and steering angle and angular rate sensors.

In an embodiment, the sensors 121 also include sensors for sensing or measuring properties of the AV's environment. For example, monocular or stereo video cameras 122 in the visible light, infrared or thermal (or both) spectra, LiDAR 123, RADAR, ultrasonic sensors, time-of-flight (TOF) depth sensors, speed sensors, temperature sensors, humidity sensors, and precipitation sensors.

In an embodiment, the AV system 120 includes a data storage unit 142 and memory 144 for storing machine instructions associated with computer processors 146 or data collected by sensors 121. In an embodiment, the data storage unit 142 is similar to the ROM 308 or storage device 310 described below in relation to FIG. 3. In an embodiment, memory 144 is similar to the main memory 306 described below. In an embodiment, the data storage unit 142 and memory 144 store historical, real-time, and/or predictive information about the environment 190. In an embodiment, the stored information includes maps, driving performance, traffic congestion updates or weather conditions. In an embodiment, data relating to the environment 190 is transmitted to the AV 100 via a communications channel from a remotely located database 134.

In an embodiment, the AV system 120 includes communications devices 140 for communicating measured or inferred properties of other vehicles' states and conditions, such as positions, linear and angular velocities, linear and angular accelerations, and linear and angular headings to the AV 100. These devices include Vehicle-to-Vehicle (V2V) and Vehicle-to-Infrastructure (V2I) communication devices and devices for wireless communications over point-to-point or ad hoc networks or both. In an embodiment, the communications devices 140 communicate across the electromagnetic spectrum (including radio and optical communications) or other media (e.g., air and acoustic media). A combination of Vehicle-to-Vehicle (V2V) Vehicle-to-Infrastructure (V2I) communication (and, in some embodiments, one or more other types of communication) is sometimes referred to as Vehicle-to-Everything (V2X) communication. V2X communication typically conforms to one or more communications standards for communication with, between, and among autonomous vehicles.

In an embodiment, the communication devices 140 include communication interfaces. For example, wired, wireless, WiMAX, WiFi, Bluetooth, satellite, cellular, optical, near field, infrared, or radio interfaces. The communication interfaces transmit data from a remotely located database 134 to AV system 120. In an embodiment, the remotely located database 134 is embedded in a cloud computing environment 200 as described in FIG. 2. The communication interfaces 140 transmit data collected from sensors 121 or other data related to the operation of AV 100 to the remotely located database 134. In an embodiment, communication interfaces 140 transmit information that relates to teleoperations to the AV 100. In some embodiments, the AV 100 communicates with other remote (e.g., "cloud") servers 136.

In an embodiment, the remotely located database 134 also stores and transmits digital data (e.g., storing data such as road and street locations). Such data is stored on the memory 144 on the AV 100, or transmitted to the AV 100 via a communications channel from the remotely located database 134.

In an embodiment, the remotely located database 134 stores and transmits historical information about driving properties (e.g., speed and acceleration profiles) of vehicles that have previously traveled along trajectory 198 at similar times of day. In one implementation, such data may be stored on the memory 144 on the AV 100, or transmitted to the AV 100 via a communications channel from the remotely located database 134.

Computing devices 146 located on the AV 100 algorithmically generate control actions based on both real-time sensor data and prior information, allowing the AV system 120 to execute its autonomous driving capabilities.

In an embodiment, the AV system 120 includes computer peripherals 132 coupled to computing devices 146 for providing information and alerts to, and receiving input from, a user (e.g., an occupant or a remote user) of the AV 100. In an embodiment, peripherals 132 are similar to the display 312, input device 314, and cursor controller 316 discussed below in reference to FIG. 3. The coupling is wireless or wired. Any two or more of the interface devices may be integrated into a single device.

Figure 2:
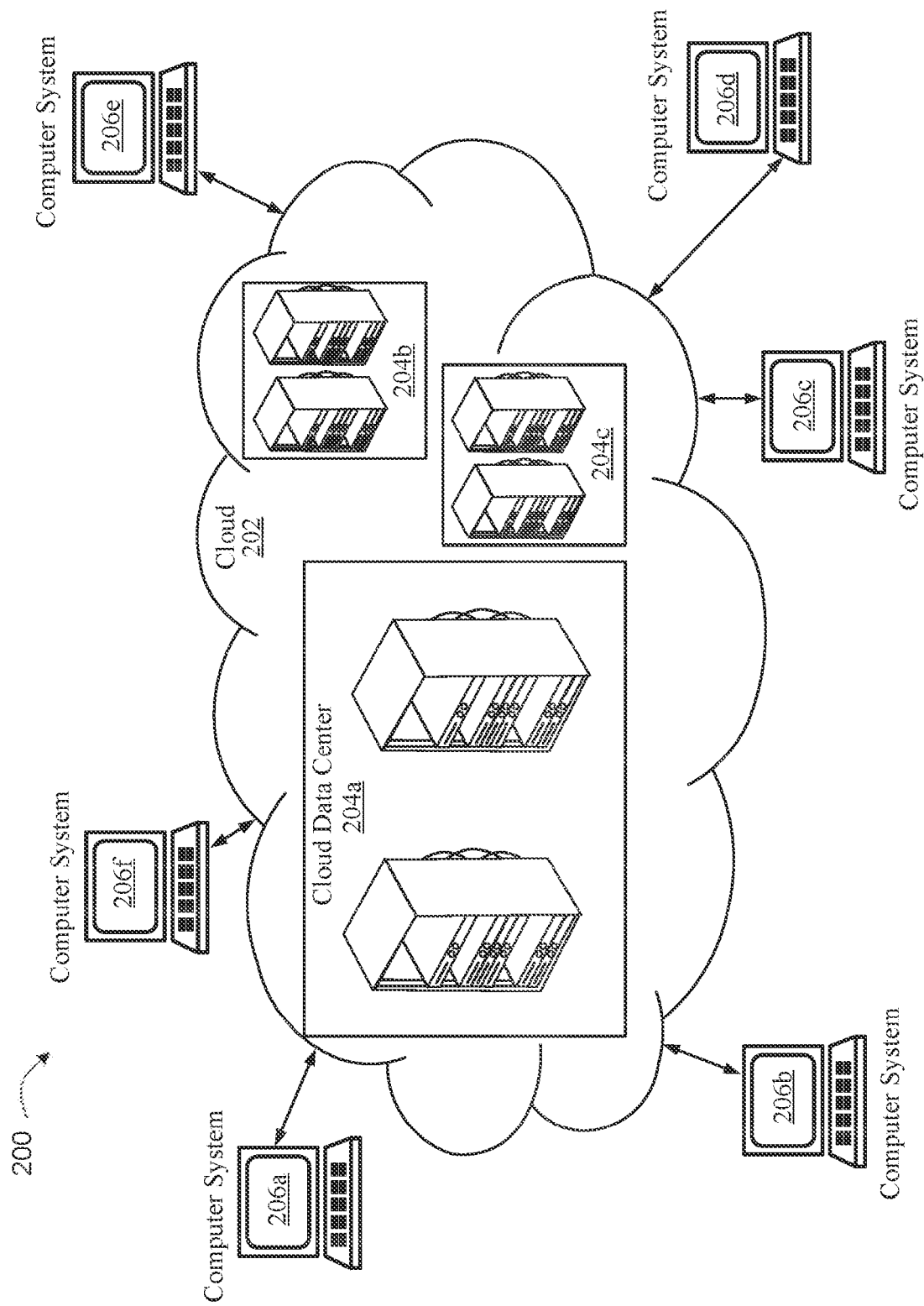
FIG. 2 illustrates an example "cloud" computing environment.

FIG. 2 illustrates an example "cloud" computing environment. Cloud computing is a model of service delivery for enabling convenient, on-demand network access to a shared pool of configurable computing resources (e.g., networks, network bandwidth, servers, processing, memory, storage, applications, virtual machines, and services). In typical cloud computing systems, one or more large cloud data centers house the machines used to deliver the services provided by the cloud. Referring now to FIG. 2, the cloud computing environment 200 includes cloud data centers 204a, 204b, and 204c that are interconnected through the cloud 202. Data centers 204a, 204b, and 204c provide cloud computing services to computer systems 206a, 206b, 206c, 206d, 206e, and 206f connected to cloud 202.

The cloud computing environment 200 includes one or more cloud data centers. In general, a cloud data center, for example the cloud data center 204a shown in FIG. 2, refers to the physical arrangement of servers that make up a cloud, for example the cloud 202 shown in FIG. 2, or a particular portion of a cloud. For example, servers are physically arranged in the cloud datacenter into rooms, groups, rows, and racks. A cloud datacenter has one or more zones, which include one or more rooms of servers. Each room has one or more rows of servers, and each row includes one or more racks. Each rack includes one or more individual server nodes. In some implementation, servers in zones, rooms, racks, and/or rows are arranged into groups based on physical infrastructure requirements of the datacenter facility, which include power, energy, thermal, heat, and/or other requirements. In an embodiment, the server nodes are similar to the computer system described in FIG. 3. The data center 204a has many computing systems distributed through many racks.

The cloud 202 includes cloud data centers 204a, 204b, and 204c along with the network and networking resources (for example, networking equipment, nodes, routers, switches, and networking cables) that interconnect the cloud data centers 204a, 204b, and 204c and help facilitate the computing systems' 206a-f access to cloud computing services. In an embodiment, the network represents any combination of one or more local networks, wide area networks, or internetworks coupled using wired or wireless links deployed using terrestrial or satellite connections. Data exchanged over the network, is transferred using any number of network layer protocols, such as Internet Protocol (IP), Multiprotocol Label Switching (MPLS), Asynchronous Transfer Mode (ATM), Frame Relay, etc. Furthermore, in embodiments where the network represents a combination of multiple sub-networks, different network layer protocols are used at each of the underlying sub-networks. In some embodiments, the network represents one or more interconnected internetworks, such as the public Internet.

The computing systems 206a-f or cloud computing services consumers are connected to the cloud 202 through network links and network adapters. In an embodiment, the computing systems 206a-f are implemented as various computing devices, for example servers, desktops, laptops, tablet, smartphones, Internet of Things (IoT) devices, autonomous vehicles (including, cars, drones, shuttles, trains, buses, etc.) and consumer electronics. In an embodiment, the computing systems 206a-f are implemented in or as a part of other systems.

Figure 3:
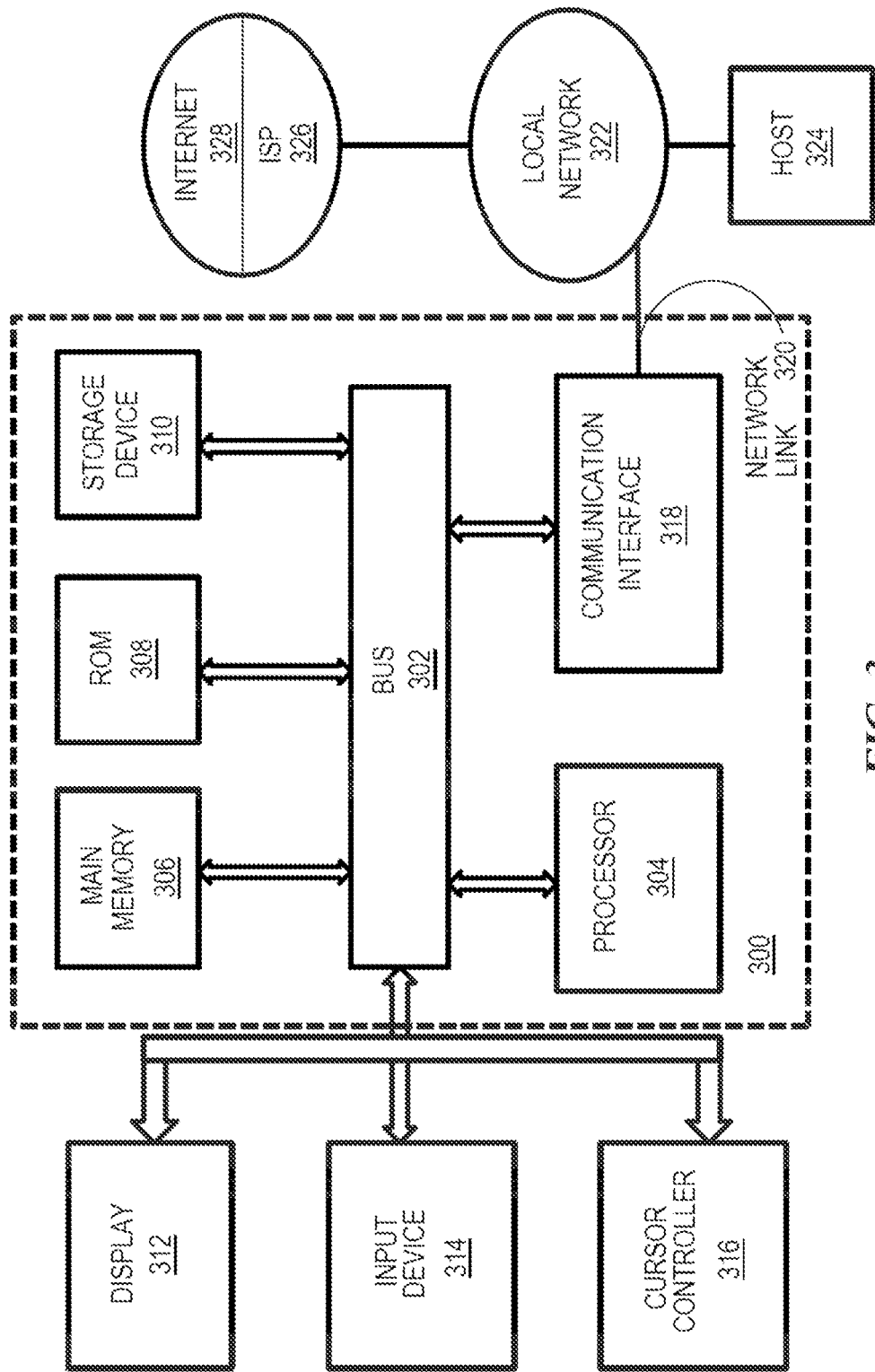
FIG. 3 illustrates a computer system.

FIG. 3 illustrates a computer system 300. In an implementation, the computer system 300 is a special purpose computing device. The special-purpose computing device is hard-wired to perform the techniques or includes digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. In various embodiments, the special-purpose computing devices are desktop computer systems, portable computer systems, handheld devices, network devices or any other device that incorporates hard-wired and/or program logic to implement the techniques.

In an embodiment, the computer system 300 includes a bus 302 or other communication mechanism for communicating information, and a hardware processor 304 coupled with a bus 302 for processing information. The hardware processor 304 is, for example, a general-purpose microprocessor. The computer system 300 also includes a main memory 306, such as a random-access memory (RAM) or other dynamic storage device, coupled to the bus 302 for storing information and instructions to be executed by processor 304. In one implementation, the main memory 306 is used for storing temporary variables or other intermediate information during execution of instructions to be executed by the processor 304. Such instructions, when stored in non-transitory storage media accessible to the processor 304, render the computer system 300 into a special-purpose machine that is customized to perform the operations specified in the instructions.

In an embodiment, the computer system 300 further includes a read only memory (ROM) 308 or other static storage device coupled to the bus 302 for storing static information and instructions for the processor 304. A storage device 310, such as a magnetic disk, optical disk, solid-state drive, or three-dimensional cross point memory is provided and coupled to the bus 302 for storing information and instructions.

In an embodiment, the computer system 300 is coupled via the bus 302 to a display 312, such as a cathode ray tube (CRT), a liquid crystal display (LCD), plasma display, light emitting diode (LED) display, or an organic light emitting diode (OLED) display for displaying information to a computer user. An input device 314, including alphanumeric and other keys, is coupled to bus 302 for communicating information and command selections to the processor 304. Another type of user input device is a cursor controller 316, such as a mouse, a trackball, a touch-enabled display, or cursor direction keys for communicating direction information and command selections to the processor 304 and for controlling cursor movement on the display 312. This input device typically has two degrees of freedom in two axes, a first axis (e.g., x-axis) and a second axis (e.g., y-axis), that allows the device to specify positions in a plane.

According to one embodiment, the techniques herein are performed by the computer system 300 in response to the processor 304 executing one or more sequences of one or more instructions contained in the main memory 306. Such instructions are read into the main memory 306 from another storage medium, such as the storage device 310. Execution of the sequences of instructions contained in the main memory 306 causes the processor 304 to perform the process steps described herein. In alternative embodiments, hard-wired circuitry is used in place of or in combination with software instructions.

The term "storage media" as used herein refers to any non-transitory media that store data and/or instructions that cause a machine to operate in a specific fashion. Such storage media includes non-volatile media and/or volatile media. Non-volatile media includes, for example, optical disks, magnetic disks, solid-state drives, or three-dimensional cross point memory, such as the storage device 310. Volatile media includes dynamic memory, such as the main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NV-RAM, or any other memory chip or cartridge.

Storage media is distinct from but may be used in conjunction with transmission media. Transmission media participates in transferring information between storage media. For example, transmission media includes coaxial cables, copper wire and fiber optics, including the wires that comprise the bus 302. Transmission media can also take the form of acoustic or light waves, such as those generated during radio-wave and infrared data communications.

In an embodiment, various forms of media are involved in carrying one or more sequences of one or more instructions to the processor 304 for execution. For example, the instructions are initially carried on a magnetic disk or solid-state drive of a remote computer. The remote computer loads the instructions into its dynamic memory and send the instructions over a telephone line using a modem. A modem local to the computer system 300 receives the data on the telephone line and use an infrared transmitter to convert the data to an infrared signal. An infrared detector receives the data carried in the infrared signal and appropriate circuitry places the data on the bus 302. The bus 302 carries the data to the main memory 306, from which processor 304 retrieves and executes the instructions. The instructions received by the main memory 306 may optionally be stored on the storage device 310 either before or after execution by processor 304.

The computer system 300 also includes a communication interface 318 coupled to the bus 302. The communication interface 318 provides a two-way data communication coupling to a network link 320 that is connected to a local network 322. For example, the communication interface 318 is an integrated service digital network (ISDN) card, cable modem, satellite modem, or a modem to provide a data communication connection to a corresponding type of telephone line. As another example, the communication interface 318 is a local area network (LAN) card to provide a data communication connection to a compatible LAN. In some implementations, wireless links are also implemented. In any such implementation, the communication interface 318 sends and receives electrical, electromagnetic, or optical signals that carry digital data streams representing various types of information.

The network link 320 typically provides data communication through one or more networks to other data devices. For example, the network link 320 provides a connection through the local network 322 to a host computer 324 or to a cloud data center or equipment operated by an Internet Service Provider (ISP) 326. The ISP 326 in turn provides data communication services through the world-wide packet data communication network now commonly referred to as the "Internet" 328. The local network 322 and Internet 328 both use electrical, electromagnetic or optical signals that carry digital data streams. The signals through the various networks and the signals on the network link 320 and through the communication interface 318, which carry the digital data to and from the computer system 300, are example forms of transmission media. In an embodiment, the network 320 contains the cloud 202 or a part of the cloud 202 described above.

The computer system 300 sends messages and receives data, including program code, through the network(s), the network link 320, and the communication interface 318. In an embodiment, the computer system 300 receives code for processing. The received code is executed by the processor 304 as it is received, and/or stored in storage device 310, or other non-volatile storage for later execution.

Autonomous Vehicle Architecture

Figure 4:
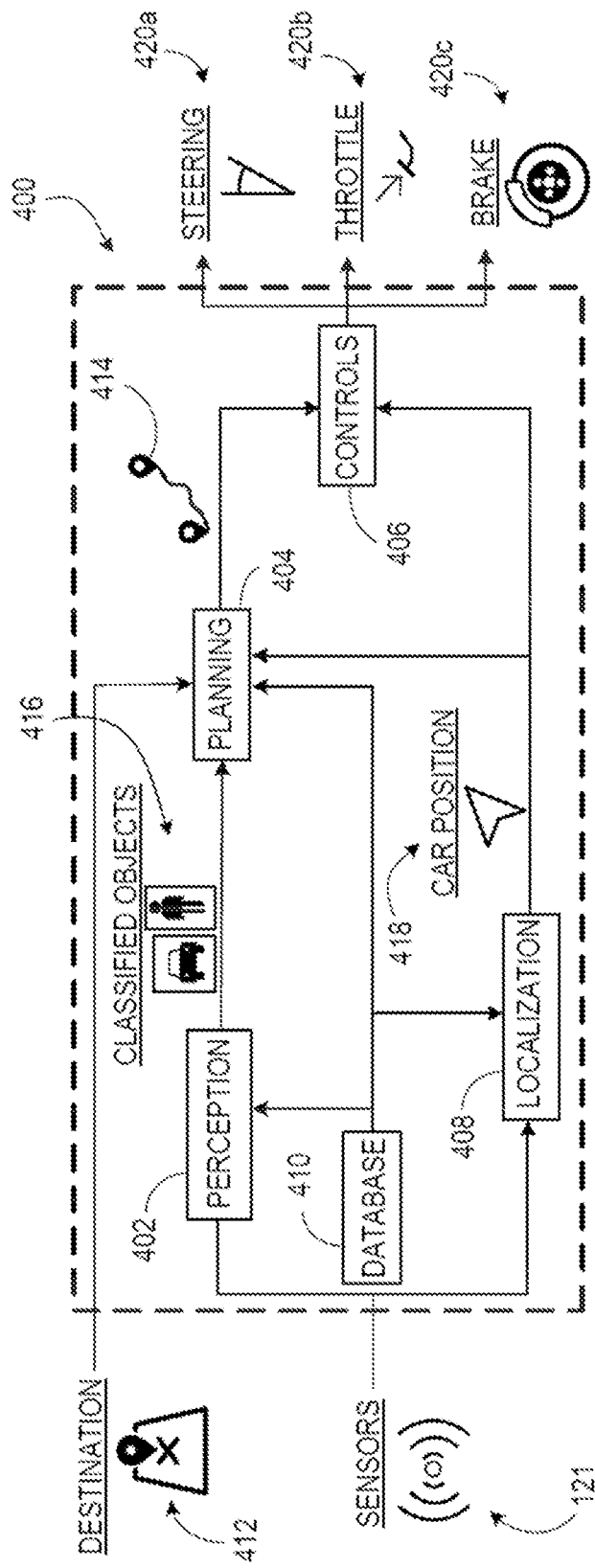
FIG. 4 shows an example architecture for an autonomous vehicle.

FIG. 4 shows an example architecture 400 for an autonomous vehicle (e.g., the AV 100 shown in FIG. 1). The architecture 400 includes a perception module 402 (sometimes referred to as a perception circuit), a planning module 404 (sometimes referred to as a planning circuit), a control module 406 (sometimes referred to as a control circuit), a localization module 408 (sometimes referred to as a localization circuit), and a database module 410 (sometimes referred to as a database circuit). Each module plays a role in the operation of the AV 100. Together, the modules 402, 404, 406, 408, and 410 may be part of the AV system 120 shown in FIG. 1. In some embodiments, any of the modules 402, 404, 406, 408, and 410 is a combination of computer software (e.g., executable code stored on a computer-readable medium) and computer hardware (e.g., one or more microprocessors, microcontrollers, application-specific integrated circuits [ASICs]), hardware memory devices, other types of integrated circuits, other types of computer hardware, or a combination of any or all of these things).

In use, the planning module 404 receives data representing a destination 412 and determines data representing a trajectory 414 (sometimes referred to as a route) that can be traveled by the AV 100 to reach (e.g., arrive at) the destination 412. In order for the planning module 404 to determine the data representing the trajectory 414, the planning module 404 receives data from the perception module 402, the localization module 408, and the database module 410.

The perception module 402 identifies nearby physical objects using one or more sensors 121, e.g., as also shown in FIG. 1. The objects are classified (e.g., grouped into types such as pedestrian, bicycle, automobile, traffic sign, etc.) and a scene description including the classified objects 416 is provided to the planning module 404.

The planning module 404 also receives data representing the AV position 418 from the localization module 408. The localization module 408 determines the AV position by using data from the sensors 121 and data from the database module 410 (e.g., a geographic data) to calculate a position. For example, the localization module 408 uses data from a GNSS (Global Navigation Satellite System) sensor and geographic data to calculate a longitude and latitude of the AV. In an embodiment, data used by the localization module 408 includes high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations of them), and maps describing the spatial locations of road features such as crosswalks, traffic signs or other travel signals of various types.

The control module 406 receives the data representing the trajectory 414 and the data representing the AV position 418 and operates the control functions 420a-c (e.g., steering, throttling, braking, ignition) of the AV in a manner that will cause the AV 100 to travel the trajectory 414 to the destination 412. For example, if the trajectory 414 includes a left turn, the control module 406 will operate the control functions 420a-c in a manner such that the steering angle of the steering function will cause the AV 100 to turn left and the throttling and braking will cause the AV 100 to pause and wait for passing pedestrians or vehicles before the turn is made.

Autonomous Vehicle Inputs

Figure 5:
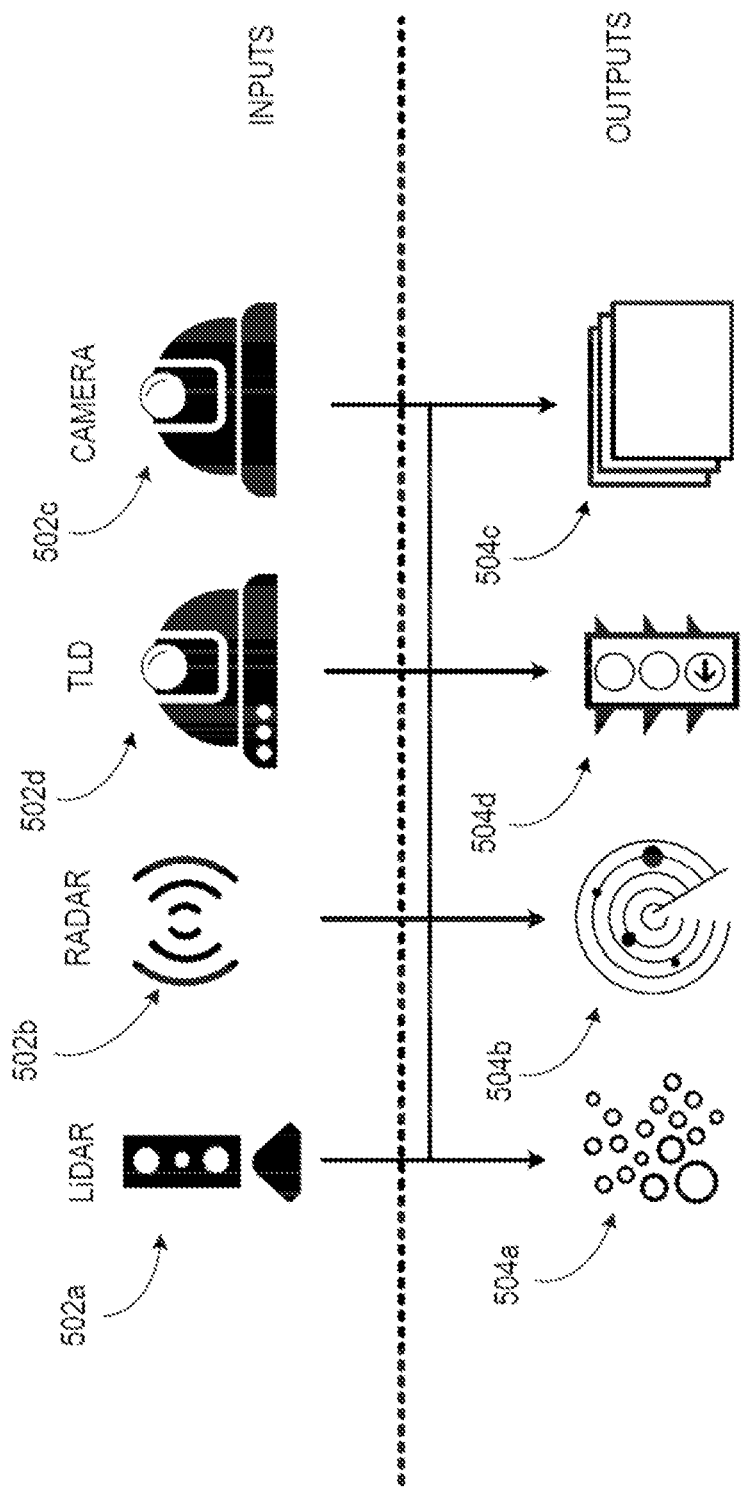
FIG. 5 shows an example of inputs and outputs that may be used by a perception module.

FIG. 5 shows an example of inputs 502a-d (e.g., sensors 121 shown in FIG. 1) and outputs 504a-d (e.g., sensor data) that is used by the perception module 402 (FIG. 4). One input 502a is a LiDAR (Light Detection and Ranging) system (e.g., LiDAR 123 shown in FIG. 1). LiDAR is a technology that uses light (e.g., bursts of light such as infrared light) to obtain data about physical objects in its line of sight. A LiDAR system produces LiDAR data as output 504a. For example, LiDAR data is collections of 3D or 2D points (also known as a point clouds) that are used to construct a representation of the environment 190.

Another input 502b is a RADAR system. RADAR is a technology that uses radio waves to obtain data about nearby physical objects. RADARs can obtain data about objects not within the line of sight of a LiDAR system. A RADAR system 502b produces RADAR data as output 504b. For example, RADAR data are one or more radio frequency electromagnetic signals that are used to construct a representation of the environment 190.

Another input 502c is a camera system. A camera system uses one or more cameras (e.g., digital cameras using a light sensor such as a charge-coupled device [CCD]) to obtain information about nearby physical objects. A camera system produces camera data as output 504c. Camera data often takes the form of image data (e.g., data in an image data format such as RAW, JPEG, PNG, etc.). In some examples, the camera system has multiple independent cameras, e.g., for the purpose of stereopsis (stereo vision), which enables the camera system to perceive depth. Although the objects perceived by the camera system are described here as "nearby," this is relative to the AV. In use, the camera system may be configured to "see" objects far, e.g., up to a kilometer or more ahead of the AV. Accordingly, the camera system may have features such as sensors and lenses that are optimized for perceiving objects that are far away.

Another input 502d is a traffic light detection (TLD) system. A TLD system uses one or more cameras to obtain information about traffic lights, street signs, and other physical objects that provide visual navigation information. A TLD system produces TLD data as output 504d. TLD data often takes the form of image data (e.g., data in an image data format such as RAW, JPEG, PNG, etc.). A TLD system differs from a system incorporating a camera in that a TLD system uses a camera with a wide field of view (e.g., using a wide-angle lens or a fish-eye lens) in order to obtain information about as many physical objects providing visual navigation information as possible, so that the AV 100 has access to all relevant navigation information provided by these objects. For example, the viewing angle of the TLD system may be about 120 degrees or more.

In some embodiments, outputs 504a-d are combined using a sensor fusion technique. Thus, either the individual outputs 504a-d are provided to other systems of the AV 100 (e.g., provided to a planning module 404 as shown in FIG. 4), or the combined output can be provided to the other systems, either in the form of a single combined output or multiple combined outputs of the same type (e.g., using the same combination technique or combining the same outputs or both) or different types type (e.g., using different respective combination techniques or combining different respective outputs or both). In some embodiments, an early fusion technique is used. An early fusion technique is characterized by combining outputs before one or more data processing steps are applied to the combined output. In some embodiments, a late fusion technique is used. A late fusion technique is characterized by combining outputs after one or more data processing steps are applied to the individual outputs.

Figure 6:
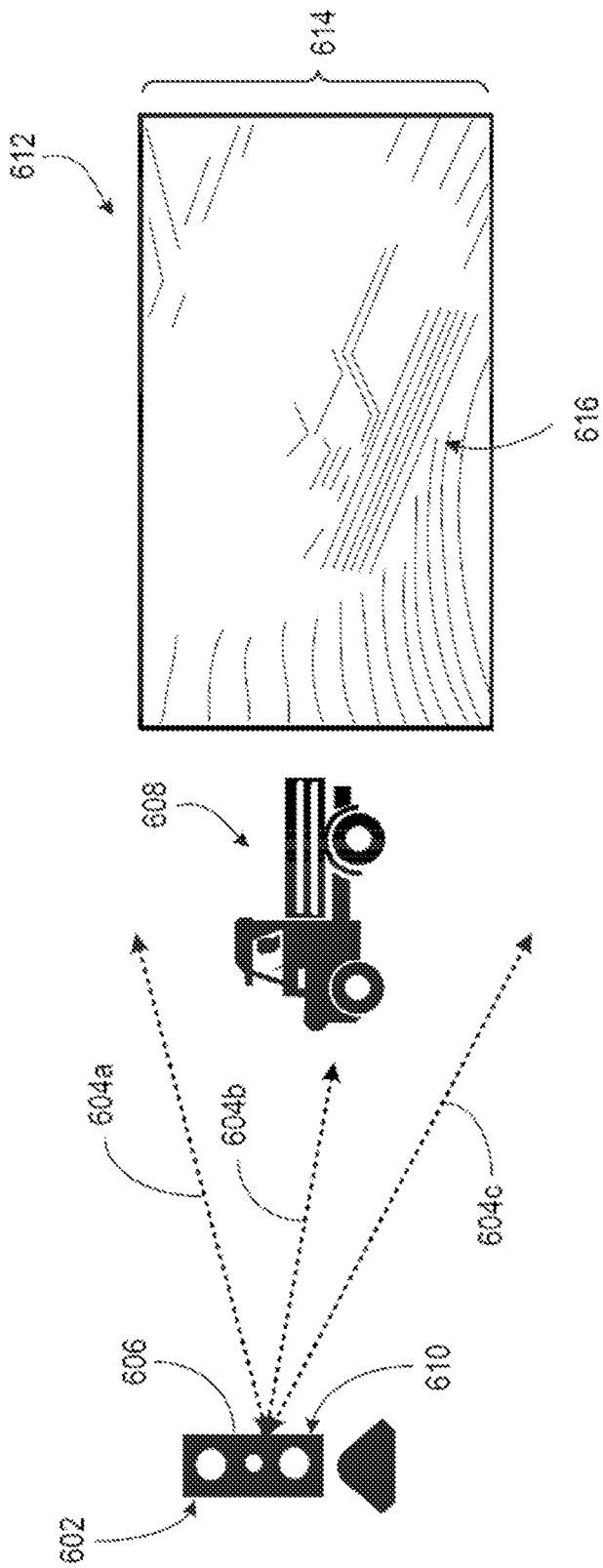
FIG. 6 shows an example of a LiDAR system.

FIG. 6 shows an example of a LiDAR system 602 (e.g., the input 502a shown in FIG. 5). The LiDAR system 602 emits light 604a-c from a light emitter 606 (e.g., a laser transmitter). Light emitted by a LiDAR system is typically not in the visible spectrum; for example, infrared light is often used. Some of the light 604b emitted encounters a physical object 608 (e.g., a vehicle) and reflects back to the LiDAR system 602. (Light emitted from a LiDAR system typically does not penetrate physical objects, e.g., physical objects in solid form.) The LiDAR system 602 also has one or more light detectors 610, which detect the reflected light. In an embodiment, one or more data processing systems associated with the LiDAR system generates an image 612 representing the field of view 614 of the LiDAR system. The image 612 includes information that represents the boundaries 616 of a physical object 608. In this way, the image 612 is used to determine the boundaries 616 of one or more physical objects near an AV.

Figure 7:
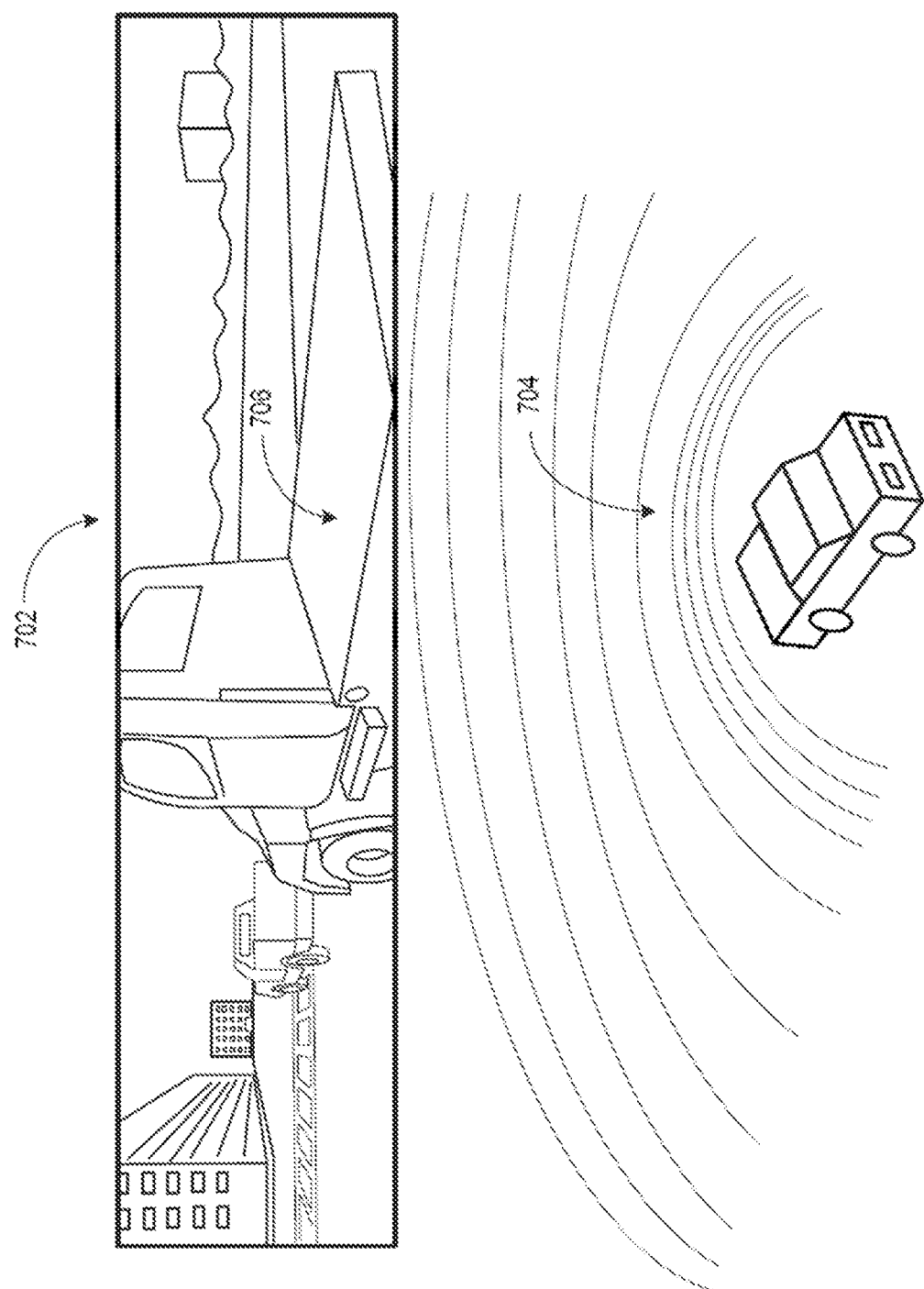
FIG. 7 shows the LiDAR system in operation.

FIG. 7 shows the LiDAR system 602 in operation. In the scenario shown in this figure, the AV 100 receives both camera system output 504c in the form of an image 702 and LiDAR system output 504a in the form of LiDAR data points 704. In use, the data processing systems of the AV 100 compares the image 702 to the data points 704. In particular, a physical object 706 identified in the image 702 is also identified among the data points 704. In this way, the AV 100 perceives the boundaries of the physical object based on the contour and density of the data points 704.

Figure 8:
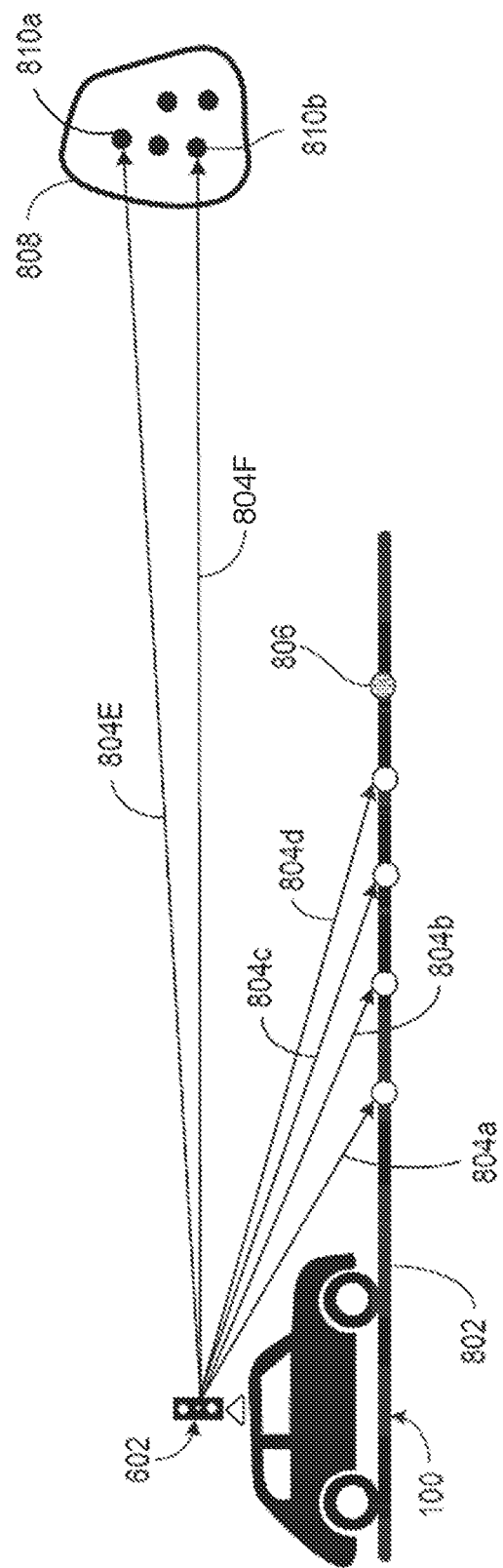
FIG. 8 shows the operation of the LiDAR system in additional detail.

FIG. 8 shows the operation of the LiDAR system 602 in additional detail. As described above, the AV 100 detects the boundary of a physical object based on characteristics of the data points detected by the LiDAR system 602. As shown in FIG. 8, a flat object, such as the ground 802, will reflect light 804a-d emitted from a LiDAR system 602 in a consistent manner. Put another way, because the LiDAR system 602 emits light using consistent spacing, the ground 802 will reflect light back to the LiDAR system 602 with the same consistent spacing. As the AV 100 travels over the ground 802, the LiDAR system 602 will continue to detect light reflected by the next valid ground point 806 if nothing is obstructing the road. However, if an object 808 obstructs the road, light 804e-f emitted by the LiDAR system 602 will be reflected from points 810a-b in a manner inconsistent with the expected consistent manner. From this information, the AV 100 can determine that the object 808 is present.

Path Planning

Figure 9:
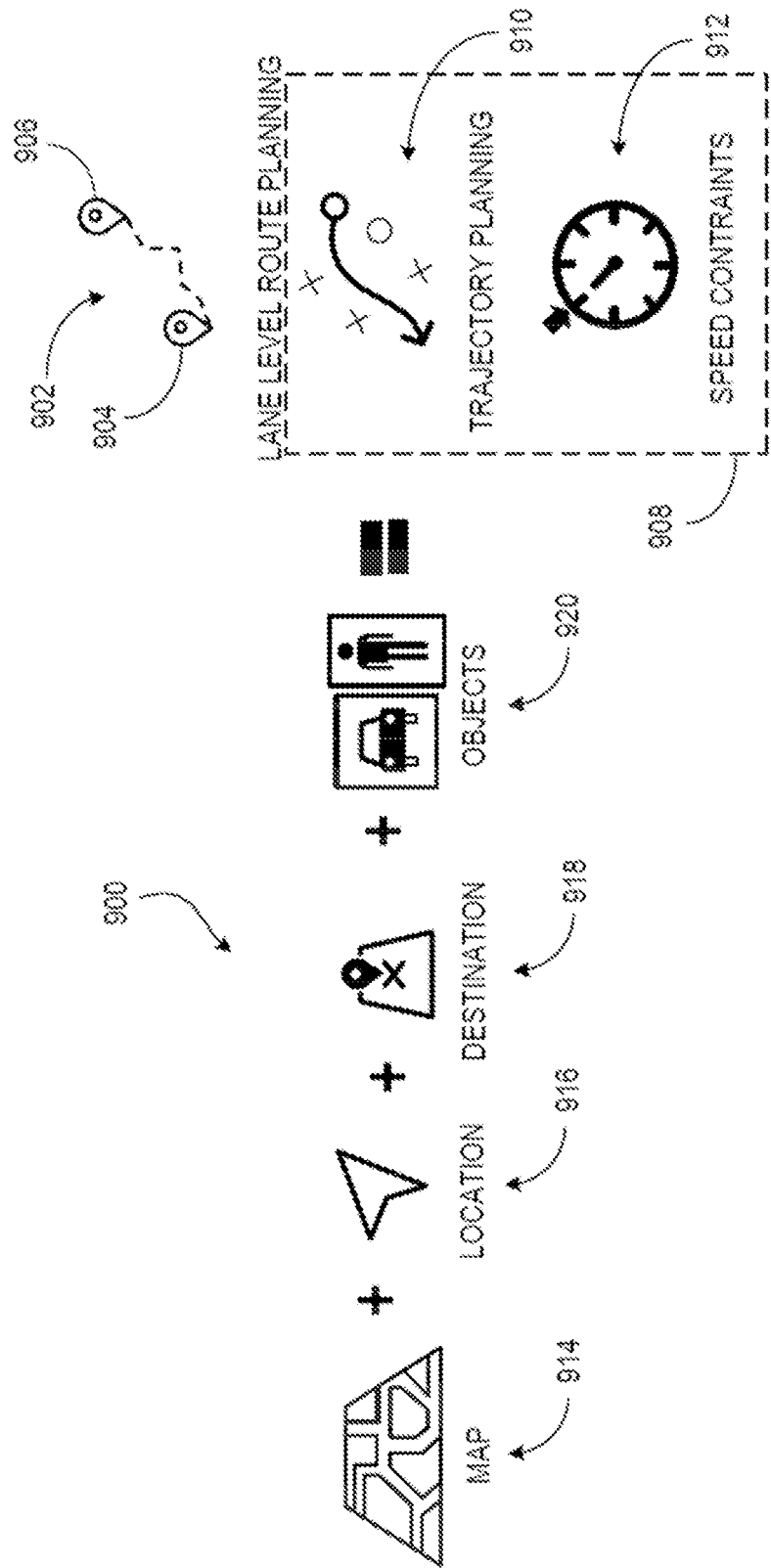
FIG. 9 shows a block diagram of the relationships between inputs and outputs of a planning module.

FIG. 9 shows a block diagram 900 of the relationships between inputs and outputs of a planning module 404 (e.g., as shown in FIG. 4). In general, the output of a planning module 404 is a route 902 from a start point 904 (e.g., source location or initial location), and an end point 906 (e.g., destination or final location). The route 902 is typically defined by one or more segments. For example, a segment is a distance to be traveled over at least a portion of a street, road, highway, driveway, or other physical area appropriate for automobile travel. In some examples, e.g., if the AV 100 is an off-road capable vehicle such as a four-wheel-drive (4WD) or all-wheel-drive (AWD) car, SUV, pick-up truck, or the like, the route 902 includes "off-road" segments such as unpaved paths or open fields.

In addition to the route 902, a planning module also outputs lane-level route planning data 908. The lane-level route planning data 908 is used to traverse segments of the route 902 based on conditions of the segment at a particular time. For example, if the route 902 includes a multi-lane highway, the lane-level route planning data 908 includes trajectory planning data 910 that the AV 100 can use to choose a lane among the multiple lanes, e.g., based on whether an exit is approaching, whether one or more of the lanes have other vehicles, or other factors that vary over the course of a few minutes or less. Similarly, in some implementations, the lane-level route planning data 908 includes speed constraints 912 specific to a segment of the route 902. For example, if the segment includes pedestrians or unexpected traffic, the speed constraints 912 may limit the AV 100 to a travel speed slower than an expected speed, e.g., a speed based on speed limit data for the segment.

In an embodiment, the inputs to the planning module 404 includes database data 914 (e.g., from the database module 410 shown in FIG. 4), current location data 916 (e.g., the AV position 418 shown in FIG. 4), destination data 918 (e.g., for the destination 412 shown in FIG. 4), and object data 920

(e.g., the classified objects 416 as perceived by the perception module 402 as shown in FIG. 4). In some embodiments, the database data 914 includes rules used in planning. Rules are specified using a formal language, e.g., using Boolean logic. In any given situation encountered by the AV 100, at least some of the rules will apply to the situation. A rule applies to a given situation if the rule has conditions that are met based on information available to the AV 100, e.g., information about the surrounding environment. Rules can have priority. For example, a rule that says, "if the road is a freeway, move to the leftmost lane" can have a lower priority than "if the exit is approaching within a mile, move to the rightmost lane."

Figure 10:
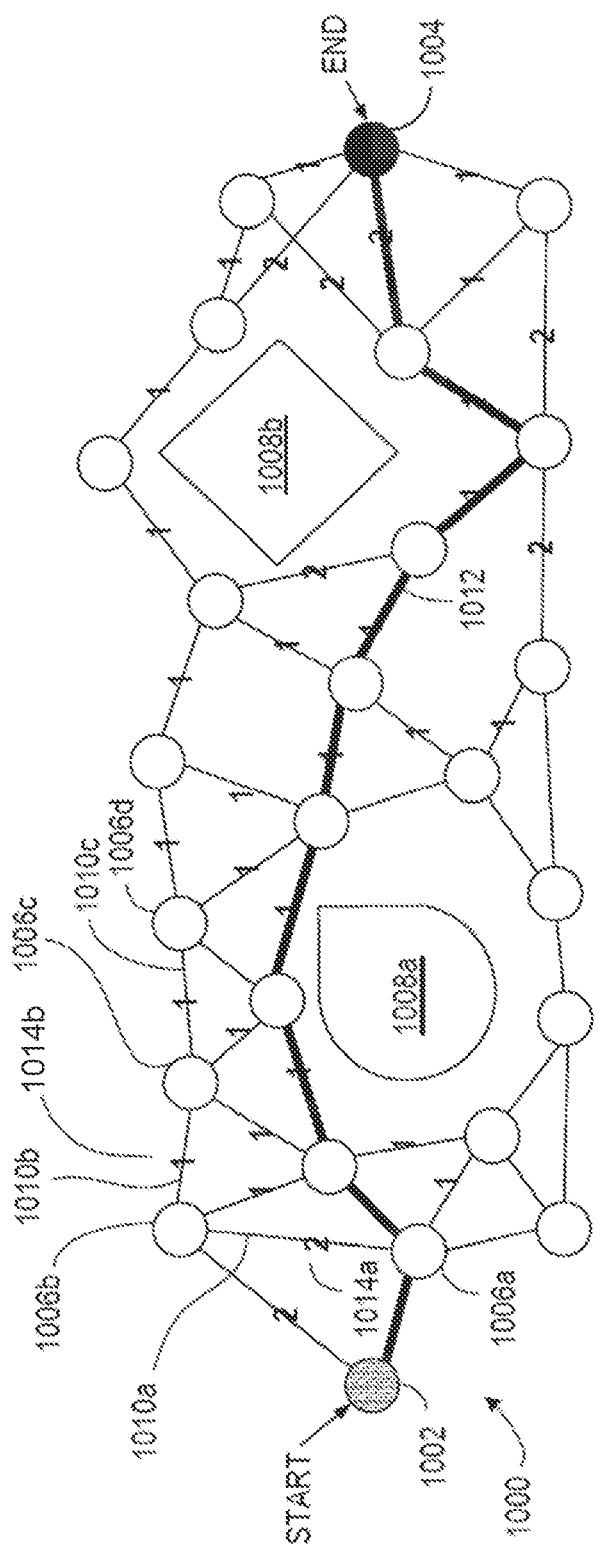
FIG. 10 shows a directed graph used in path planning.

FIG. 10 shows a directed graph 1000 used in path planning, e.g., by the planning module 404 (FIG. 4). In general, a directed graph 1000 like the one shown in FIG. 10 is used to determine a path between any start point 1002 and end point 1004. In real-world terms, the distance separating the start point 1002 and end point 1004 may be relatively large (e.g, in two different metropolitan areas) or may be relatively small (e.g., two intersections abutting a city block or two lanes of a multi-lane road).

In an embodiment, the directed graph 1000 has nodes 1006a-d representing different locations between the start point 1002 and the end point 1004 that could be occupied by an AV 100. In some examples, e.g., when the start point 1002 and end point 1004 represent different metropolitan areas, the nodes 1006a-d represent segments of roads. In some examples, e.g., when the start point 1002 and the end point 1004 represent different locations on the same road, the nodes 1006a-d represent different positions on that road. In this way, the directed graph 1000 includes information at varying levels of granularity. In an embodiment, a directed graph having high granularity is also a subgraph of another directed graph having a larger scale. For example, a directed graph in which the start point 1002 and the end point 1004 are far away (e.g., many miles apart) has most of its information at a low granularity and is based on stored data, but also includes some high granularity information for the portion of the graph that represents physical locations in the field of view of the AV 100.

The nodes 1006a-d are distinct from objects 1008a-b which cannot overlap with a node. In an embodiment, when granularity is low, the objects 1008a-b represent regions that cannot be traversed by automobile, e.g., areas that have no streets or roads. When granularity is high, the objects 1008a-b represent physical objects in the field of view of the AV 100, e.g., other automobiles, pedestrians, or other entities with which the AV 100 cannot share physical space. In an embodiment, some or all of the objects 1008a-b are a static objects (e.g., an object that does not change position such as a street lamp or utility pole) or dynamic objects (e.g., an object that is capable of changing position such as a pedestrian or other car).

The nodes 1006a-d are connected by edges 1010a-c. If two nodes 1006a-b are connected by an edge 1010a, it is possible for an AV 100 to travel between one node 1006a and the other node 1006b, e.g., without having to travel to an intermediate node before arriving at the other node 1006b. (When we refer to an AV 100 traveling between nodes, we mean that the AV 100 travels between the two physical positions represented by the respective nodes.) The edges 1010a-c are often bidirectional, in the sense that an AV 100 travels from a first node to a second node, or from the second node to the first node. In an embodiment, edges 1010a-c are unidirectional, in the sense that an AV 100 can travel from a first node to a second node, however the AV 100 cannot travel from the second node to the first node. Edges 1010a-c are unidirectional when they represent, for example, one-way streets, individual lanes of a street, road, or highway, or other features that can only be traversed in one direction due to legal or physical constraints.

In an embodiment, the planning module 404 uses the directed graph 1000 to identify a path 1012 made up of nodes and edges between the start point 1002 and end point 1004.

An edge 1010a-c has an associated cost 1014a-b. The cost 1014a-b is a value that represents the resources that will be expended if the AV 100 chooses that edge. A typical resource is time. For example, if one edge 1010a represents a physical distance that is twice that as another edge 1010b, then the associated cost 1014a of the first edge 1010a may be twice the associated cost 1014b of the second edge 1010b. Other factors that affect time include expected traffic, number of intersections, speed limit, etc. Another typical resource is fuel economy. Two edges 1010a-b may represent the same physical distance, but one edge 1010a may require more fuel than another edge 1010b, e.g., because of road conditions, expected weather, etc.

When the planning module 404 identifies a path 1012 between the start point 1002 and end point 1004, the planning module 404 typically chooses a path optimized for cost, e.g., the path that has the least total cost when the individual costs of the edges are added together.

Autonomous Vehicle Control

Figure 11:
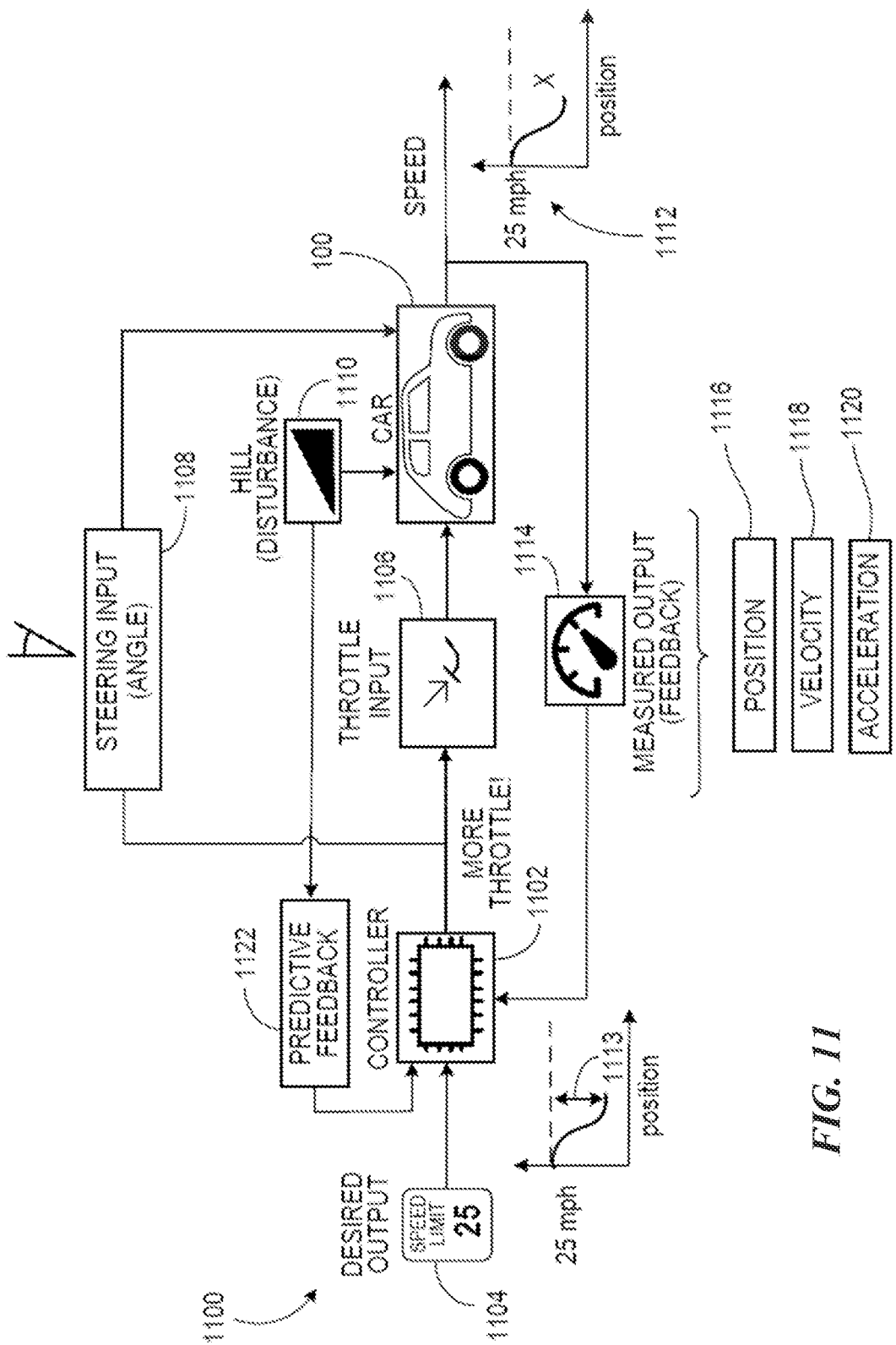
FIG. 11 shows a block diagram of the inputs and outputs of a control module.

FIG. 11 shows a block diagram 1100 of the inputs and outputs of a control module 406 (e.g., as shown in FIG. 4). A control module operates in accordance with a controller 1102 which includes, for example, one or more processors (e.g., one or more computer processors such as microprocessors or microcontrollers or both) similar to processor 304, short-term and/or long-term data storage (e.g., memory random-access memory or flash memory or both) similar to main memory 306, ROM 308, and storage device 310, and instructions stored in memory that carry out operations of the controller 1102 when the instructions are executed (e.g., by the one or more processors).

In an embodiment, the controller 1102 receives data representing a desired output 1104. The desired output 1104 typically includes a velocity, e.g., a speed and a heading. The desired output 1104 can be based on, for example, data received from a planning module 404 (e.g., as shown in FIG. 4). In accordance with the desired output 1104, the controller 1102 produces data usable as a throttle input 1106 and a steering input 1108. The throttle input 1106 represents the magnitude in which to engage the throttle (e.g., acceleration control) of an AV 100, e.g., by engaging the steering pedal, or engaging another throttle control, to achieve the desired output 1104. In some examples, the throttle input 1106 also includes data usable to engage the brake (e.g., deceleration control) of the AV 100. The steering input 1108 represents a steering angle, e.g., the angle at which the steering control (e.g., steering wheel, steering angle actuator, or other functionality for controlling steering angle) of the AV should be positioned to achieve the desired output 1104.

In an embodiment, the controller 1102 receives feedback that is used in adjusting the inputs provided to the throttle and steering. For example, if the AV 100 encounters a disturbance 1110, such as a hill, the measured speed 1112 of the AV 100 is lowered below the desired output speed. In an embodiment, any measured output 1114 is provided to the controller 1102 so that the necessary adjustments are performed, e.g., based on the differential 1113 between the measured speed and desired output. The measured output 1114 includes measured position 1116, measured velocity 1118, (including speed and heading), measured acceleration 1120, and other outputs measurable by sensors of the AV 100.

In an embodiment, information about the disturbance 1110 is detected in advance, e.g., by a sensor such as a camera or LiDAR sensor, and provided to a predictive feedback module 1122. The predictive feedback module 1122 then provides information to the controller 1102 that the controller 1102 can use to adjust accordingly. For example, if the sensors of the AV 100 detect ("see") a hill, this information can be used by the controller 1102 to prepare to engage the throttle at the appropriate time to avoid significant deceleration.

Figure 12:
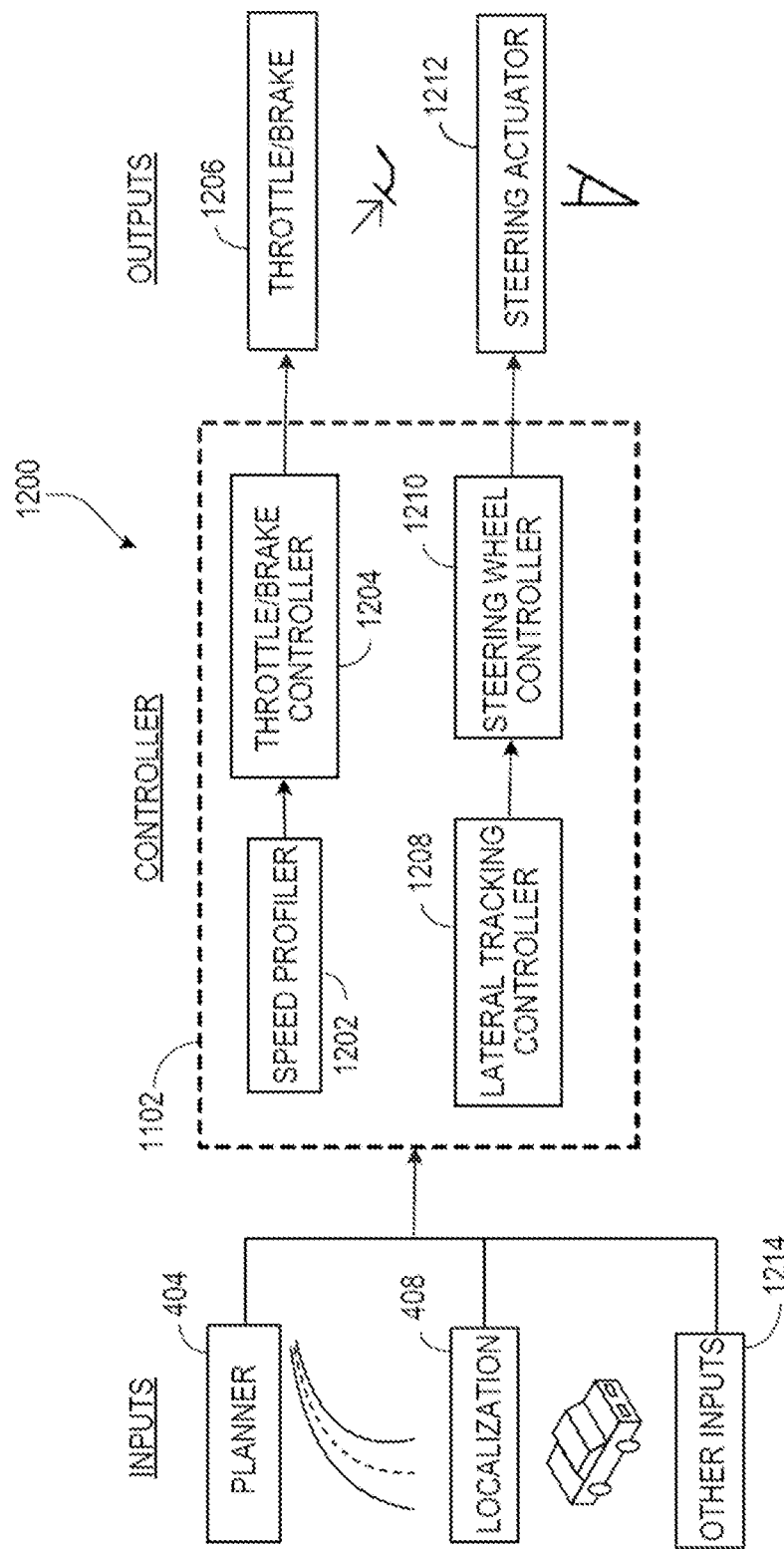
FIG. 12 shows a block diagram of the inputs, outputs, and components of a controller.

FIG. 12 shows a block diagram 1200 of the inputs, outputs, and components of the controller 1102. The controller 1102 has a speed profiler 1202 which affects the operation of a throttle/brake controller 1204. For example, the speed profiler 1202 instructs the throttle/brake controller 1204 to engage acceleration or engage deceleration using the throttle/brake 1206 depending on, e.g., feedback received by the controller 1102 and processed by the speed profiler 1202.

The controller 1102 also has a lateral tracking controller 1208 which affects the operation of a steering controller 1210. For example, the lateral tracking controller 1208 instructs the steering controller 1210 to adjust the position of the steering angle actuator 1212 depending on, e.g., feedback received by the controller 1102 and processed by the lateral tracking controller 1208.

The controller 1102 receives several inputs used to determine how to control the throttle/brake 1206 and steering angle actuator 1212. A planning module 404 provides information used by the controller 1102, for example, to choose a heading when the AV 100 begins operation and to determine which road segment to traverse when the AV 100 reaches an intersection. A localization module 408 provides information to the controller 1102 describing the current location of the AV 100, for example, so that the controller 1102 can determine if the AV 100 is at a location expected based on the manner in which the throttle/brake 1206 and steering angle actuator 1212 are being controlled. In an embodiment, the controller 1102 receives information from other inputs 1214, e.g., information received from databases, computer networks, etc.

Object Tracking Architecture

Figure 13:
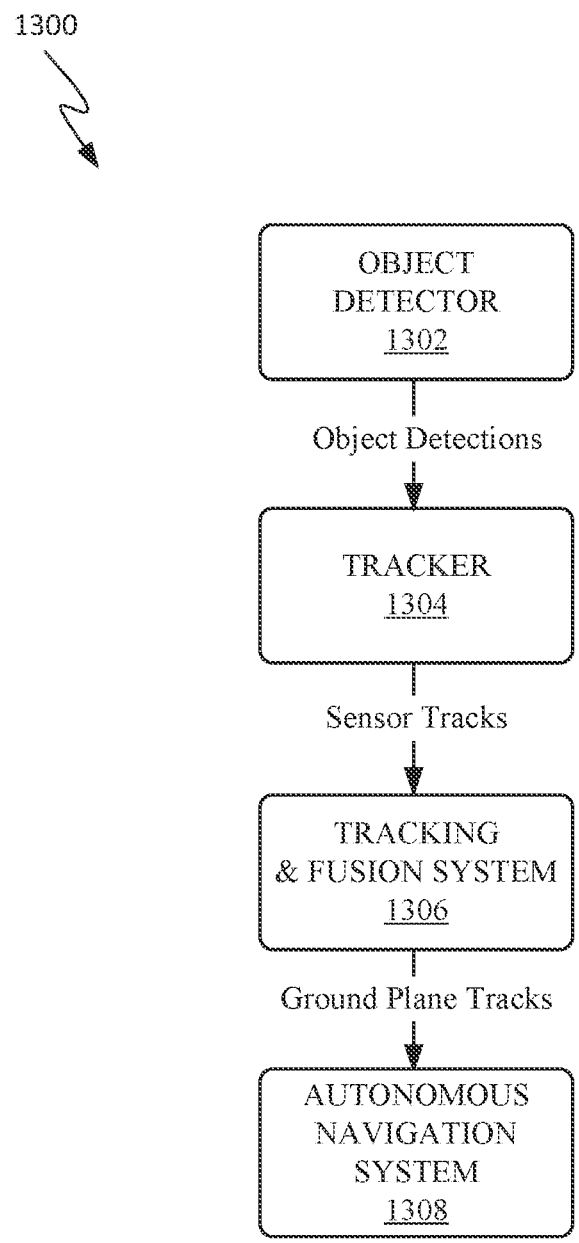
FIG. 13 shows a block diagram of a visual object tracking system.

FIG. 13 shows a block diagram describing an object tracking system 1300 implemented, for example, in AV system 120. Object detector 1302 is used to capture and perform analysis on sensor data that can include one or more images of an area surrounding an autonomous vehicle (e.g., AV 100) or non-imaging data such as RADAR or LIDAR data covering the area surrounding the autonomous vehicle. The sensor data can be captured by a capture device of object detector 1302, such as a high speed camera, video camera (e.g., camera 122), LIDAR system or RADAR system. The capture device will generally be configured to cover a wide field of view in order to minimize a number of capture devices needed to track objects proximate the autonomous vehicle. In some embodiments, the capture device can take the form of a wide field of view imaging device with a fixed focus distance and depth of field well-suited for tracking objects proximate the autonomous vehicle. Object detector 1302 can have a processing circuit that includes one or more processors 146 that analyze the sensor data to identify and classify detected objects (see descriptions of processors 146 and 304 in the text accompanying respective FIGS. 1 and 3). Visual trackers can be configured to perform analysis on any object contained within one or more images captured by the capture device, while non-imaging sensors can be configured to perform analysis based on sensor-based metrics such as detected movement and/or shape. In some embodiments, processor 146 can be configured to execute a classification routine stored in, e.g., main memory 306 or other storage media (e.g. storage device 310). The classification routine can be a correlation filter tracker, deep tracker and/or Kalman filter operative to perform the identification and/or classification process. The classification routine can be configured to distinguish between a stationary object, such as a light pole, fire hydrant or building, from a mobile object such as a car, truck, motorcycle or pedestrian. Objects classified as stationary and positioned well outside of a planned movement path of the autonomous vehicle (e.g., objects beyond a threshold distance from the planned movement path) can be safely ignored while stationary objects within or proximate the planned movement path can be tracked. Objects determined to be in motion and objects classified as mobile objects, whether in motion or stationary can be passed as detection data to a tracker 1304 for further analysis and tracking when the objects are within a threshold distance from the planned path of movement. The detection data when derived from multiple imagery frames can take many forms and include metrics such as an object position, speed, orientation, angular velocity, closing velocity and the like. Different types of detection data can affect the threshold distance for any particular object. For example, the threshold distance may depend on a direction and speed of travel of the object and may change over time as the direction and speed of travel of the object change.

Tracker 1304 is configured to generate sensor tracks from the detection data. Tracker 1304 may require multiple detections to generate sensor tracks that accurately predicting a rate at which the detected objects likely traverses a field of view of the sensor. For example, an optical system could generate sensor tracks taking the form of image plane tracks relative to objects position within an image frame, while a non-imaging sensor could generate tracks in terms of azimuth and elevation with respect to the sensor or the frame of reference could be measured with respect to an orientation of AV 100. In some embodiments, the detection data along with position data of the autonomous vehicle at the time of each image capture can be broadly referred to as tracking data. Sensor tracks generated by tracker 1304 with their accompanying tracking data are forwarded on to tracking and fusion engine 1306.

Tracking and fusion engine 1306 includes one or more processing circuits configured to convert the sensor tracks to ground plane tracks. While the conversion of sensor tracks to ground plane tracks can be a useful intermediary step, it should be appreciated that in some embodiments, the creation of ground plane tracks can instead be performed in a single step in which detection data and map data are combined to form a ground plane track. Ground plane tracks describe a location of the detected object with respect to the surface of the earth rather than a location related to the sensor. To convert the sensor tracks to ground plane tracks, a location of the sensor tracks within the sensor field of view and the location of the autonomous vehicle at the time of each of the image captures can be used to provide a line of bearing between the autonomous vehicle and corresponding detected objects. Determining a precise distance separating the autonomous vehicle can be difficult to determine from the imagery-based data with high levels of precision. In some embodiments, the distance information can be based on correlating image cues in the image frame surrounding the detected object with known locations associated with previously captured imagery. For example, a position of an object having the appearance of an automobile, offset laterally from the autonomous vehicle and located between lane markers can be determined to a reasonable level of certainty by determining an intersection of the line of bearing with the lane defined by lane markers visible in the imagery. Higher levels of lateral offset and closer ranges make this type of determination more accurate as an angle between the lane and the line of bearing derived from the images is larger. Proximity of the tracked object to visually distinct features such as traffic signals and other discernable objects within the image frame can also help to determine a distance between a particular object and the autonomous vehicle. In some embodiments, distance information can be determined by a separate range sensor such as a RADAR, LiDAR or infrared sensor. With certain configurations of the ranging sensor, the ranging sensor may only be directed to those areas corresponding to locations in which objects are visually detected.

After using the bearing and determined range information to convert the sensor tracks to ground plane tracks, tracking and fusion system 1306 can add additional prediction information to the ground plane tracks based on, e.g. map data to more accurately determine likely behavior of the object based on the objects position with respect to the map data. The map data may include information such as which direction a vehicle can turn at a particular intersection, thereby limiting the number of likely directions of travel that will be taken by a vehicle located in a particular lane. Behavior prediction can take many forms and rely on many different factors which will be discussed in greater detail below. Tracking and fusion system 1306 can forward the ground plane tracks and prediction information to an autonomous navigation system 1308 to help autonomous navigation system 1308 determine a path for the autonomous vehicle (e.g., to avoid the detected objects). In some embodiments, autonomous navigation system 1308 includes a control circuit that is responsible for directing navigation of the autonomous vehicle.

In some embodiments, the functions of tracker 1304 and tracking and fusion system 1306 can be combined allowing the creation of a single type of track allowing the generation of an intermediate track type to be skipped.

Figure 14A:
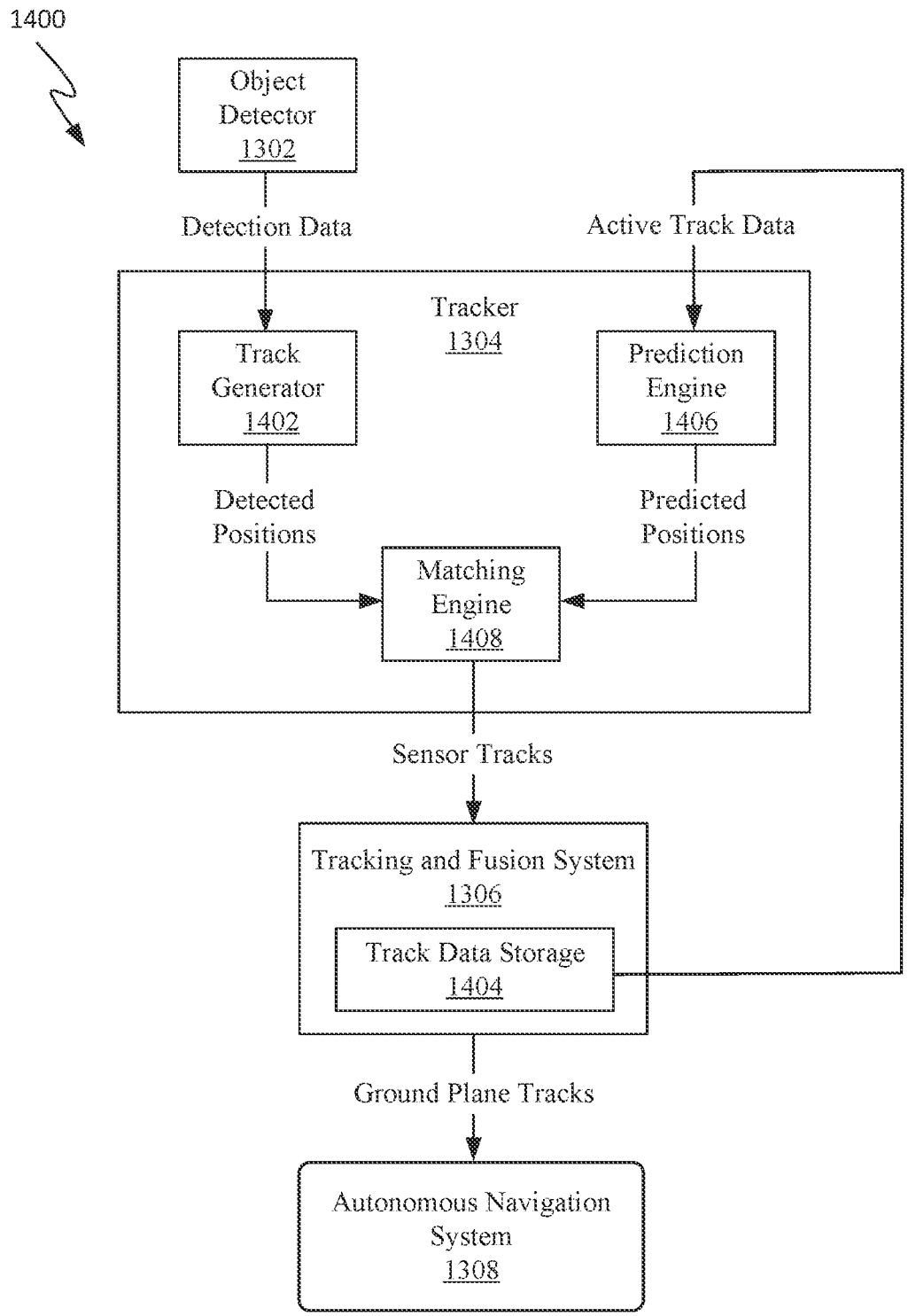
FIGS. 14A-14C show block diagrams illustrating processing of sensor tracks and ground plane tracks according to some embodiments.

FIG. 14A shows a block diagram 1400 illustrating a more detailed description of how tracker 1304 converts detection data into sensor tracks. In particular, detection data is transmitted from object detector 1302 to track generator 1402. Detection data can take many forms including, a range between the autonomous vehicle and the object, a rate of change of the range, an angular orientation of the object with respect to the autonomous vehicle and a velocity of the object. Track generator 1402 converts the detection data into sensor tracks. The sensor track can include at least a detected position of each object identified by object detector 1302. In cases where the detection data is generated from more than one frame of imagery, additional metrics such as velocity or frame crossing rate can be determined from any motion of the object across the image frame apparent from the multiple frames of imagery. In some embodiments, 5-10 image frames can be analyzed at a time. For example, by analyzing 5-10 images at a time from an optical sensor that collects 60 images per second as many as 6-12 track analyses could be performed per second with a system that considers every image collected. Slower rates of, e.g., 5-10 images per second are also possible to ease processing burdens and in situations in which few to no nearby objects are projected to interfere with a planned route of travel of the autonomous vehicle. In some embodiments a sampling speed can vary based on the existence of any perceived objects positioned in a manner that could result in an imminent collision. It should be noted that sensor capture can also vary greatly across different sensor types. For example, as appreciated by individual having an ordinary level of skill in the art, non-imaging sensors can have sensor readings at a much higher rate of speed than imagery sensors since a detection event for a non-imaging sensor can take the form of a single photon or reflected radio wave.

Track generator 1402 then generates sensor tracks, which include at minimum detected positions of the detected objects with respect to the sensor at a particular time and assigns the same track ID to each piece of data associated with each sensor track. The generated sensor tracks are then transmitted to correlation engine 1408. Tracker 1304 also receives active track data from track data storage 1404. Track data storage 1404 is shown as a subcomponent of tracking and fusion system 1306 but in some embodiments, track data storage 1404 can be separate from tracking and fusion system 1306. Track data storage 1404 can include both sensor tracks and ground plane tracks. In some embodiments, the track data can be organized in track files or objects that can include both object position relative to the sensor and ground plane position information. The active track data transmitted to tracker 1304 by track data storage 1404 can be processed by prediction engine 1406. Prediction engine 1406 can be configured to determine a likely position of each object included in the active track data. Because the active track data can include ground track data, prediction engine 1406 can also benefit from any prediction information stored in the active track data that was derived from map data restricting possible movement of the object at a particular point of time later than the newest tracking data included in the active track data.

Prediction engine 1406 outputs a sensor track that includes at least a predicted position of the objects. Matching engine 1408 compares the predicted positions of the objects derived from active track data with the detected position of the objects from the image tracks generated by track generator 1402. In some embodiments, additional metrics such as direction and speed of travel, object shape, object color and the like can be included in the comparison. The comparison helps matching engine 1408 to identify which of the detected positions correlate with predicted positions generated from the active track data provided by track data storage 1404. In some embodiments, any sensor tracks that do not correlate with a predicted position of the active tracks will be forwarded on to tracking and fusion system 1306 as a new track without any historical tracking data. Those image track files with detected positions that do correlate to a predicted position can be combined with data from the active track. Combination of the data can include assigning the same track ID to all of the combined tracking data. In some embodiments, the predicted and detected positions of the object can be combined by averaging the positions together. The way in which the predicted and detected positions are averaged together can differ based on various factors such as a level of confidence in the tracking data associated with the active track as well as a level of confidence in the quality of the object detection data.

Figure 14B:
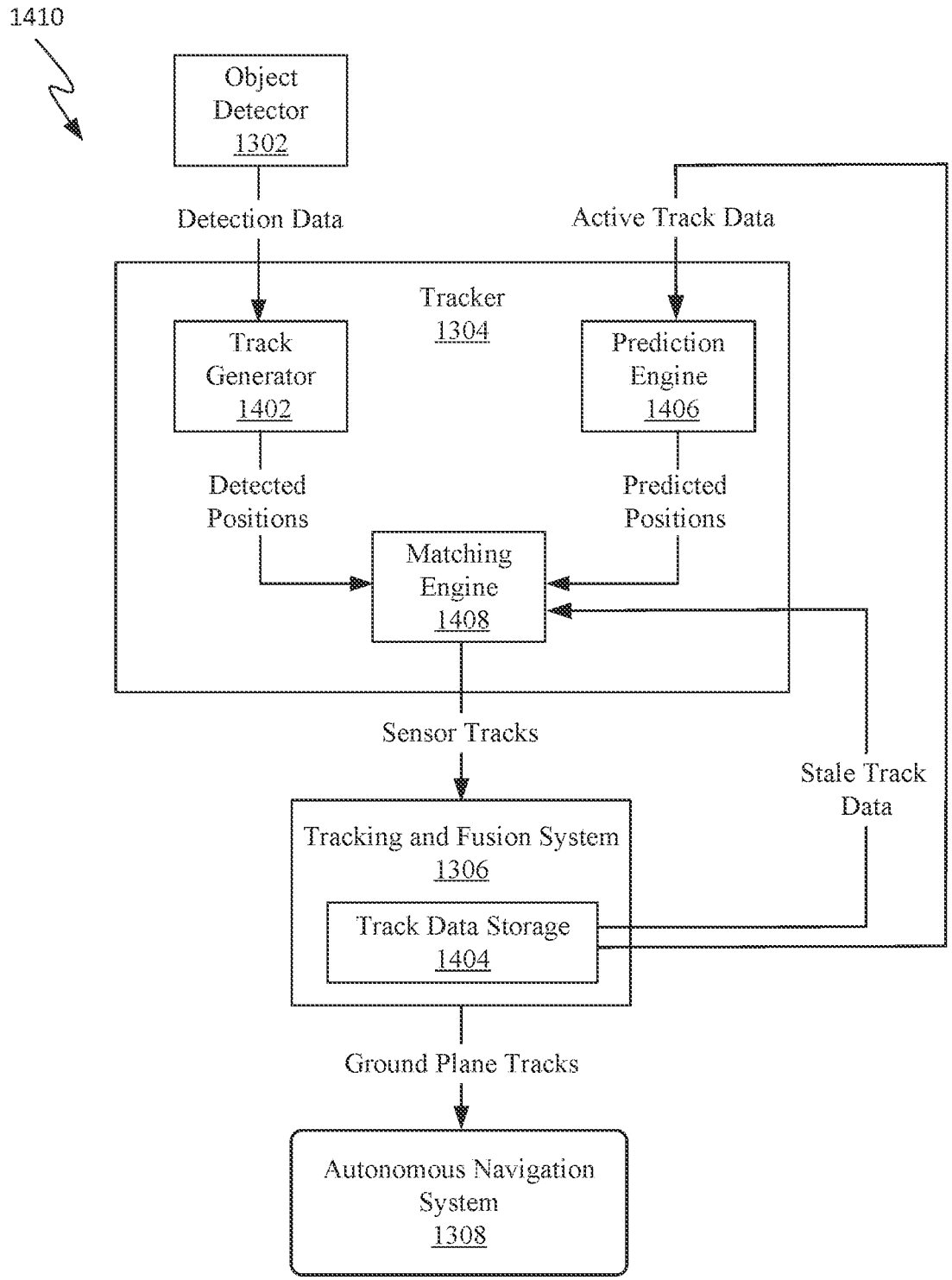

FIG. 14B shows a block diagram 1410 that includes the same components working in the same manner as described in FIG. 14A with the exception of track data storage 1404 being configured to provide stale track data to matching engine 1408. Stale tracks are those tracks that have not yet been deleted for being too old and/or have a confidence level that fails to meet a particular threshold value. Stale tracks stay in memory within track data storage until they are correlated with new tracking data and meet an active track classification criteria or are deleted. Active and stale-track criteria are generally distinguished from one another based on factors such as tracking data age, object position with respect to the autonomous vehicle and tracking data confidence. For example, a track could be considered to be an active track when tracking data of the track has been updated within a threshold period of time and/or is assigned a threshold tracking data confidence level based on the position and/or direction of travel of the object associated with the track. The stale-track criteria can also be based at least in part on a number of image frames captured without detection of the object. In some embodiments, tracking data confidence level can also be based on a temporal consistency of the data making up the tracking data. The temporal consistency of the data being a measure of how closely the sensor data used to form the second tracking data follows expected trends.

Given that in some embodiments, no predicted position is calculated for stale tracks, a matching criteria for stale track data can be based primarily upon a size and shape of the object. Orientation of the object relative to the sensor can also be a consideration. For example, a detected object having the same color but a different size and/or shape might still be matched if a detected orientation and/or position change is deemed to have caused the change in size/shape. In this case, the size and/or shape data can be disregarded or these factors can at least be weighted less heavily in the matching criteria. The matching criteria for the stale track data may also be applied only after trying to find an active track that matches one of the newly generated sensor tracks. In some embodiments, position data associated with the most recent detection or detections that are included in the stale track data can also be used as a factor in determining a likelihood of the stale track data being associated with the same object as the newly generated sensor track. For example, if the object would have had to accelerate or decelerate at an improbable rate to arrive at the newly detected position the correlation to the previously detected object could be deemed to have failed a matching criteria. When combining stale track data with newly generated sensor tracks, matching engine 1408 will generally use the detected position in lieu of trying to average the detected position with any predicted position information associated with the stale track data. As described with the active track combination of old and new tracking data, the old and new data can be combined by assigning all the tracking data the same track ID. It should be noted that in some embodiments, prediction engine 1406 can be configured to receive the stale track data prior to matching engine 1408 to allow prediction engine 1406 to generate predicted position data for stale track data having particularly high confidence levels. For example, older position data for a parked car that had been detected turning on its lights could still have a high confidence level even where the age of the sale track would normally be disqualified for prediction, thereby allowing stale track data to be used to help refine a position of the parked car deemed to be likely to move soon.

Figure 14C:
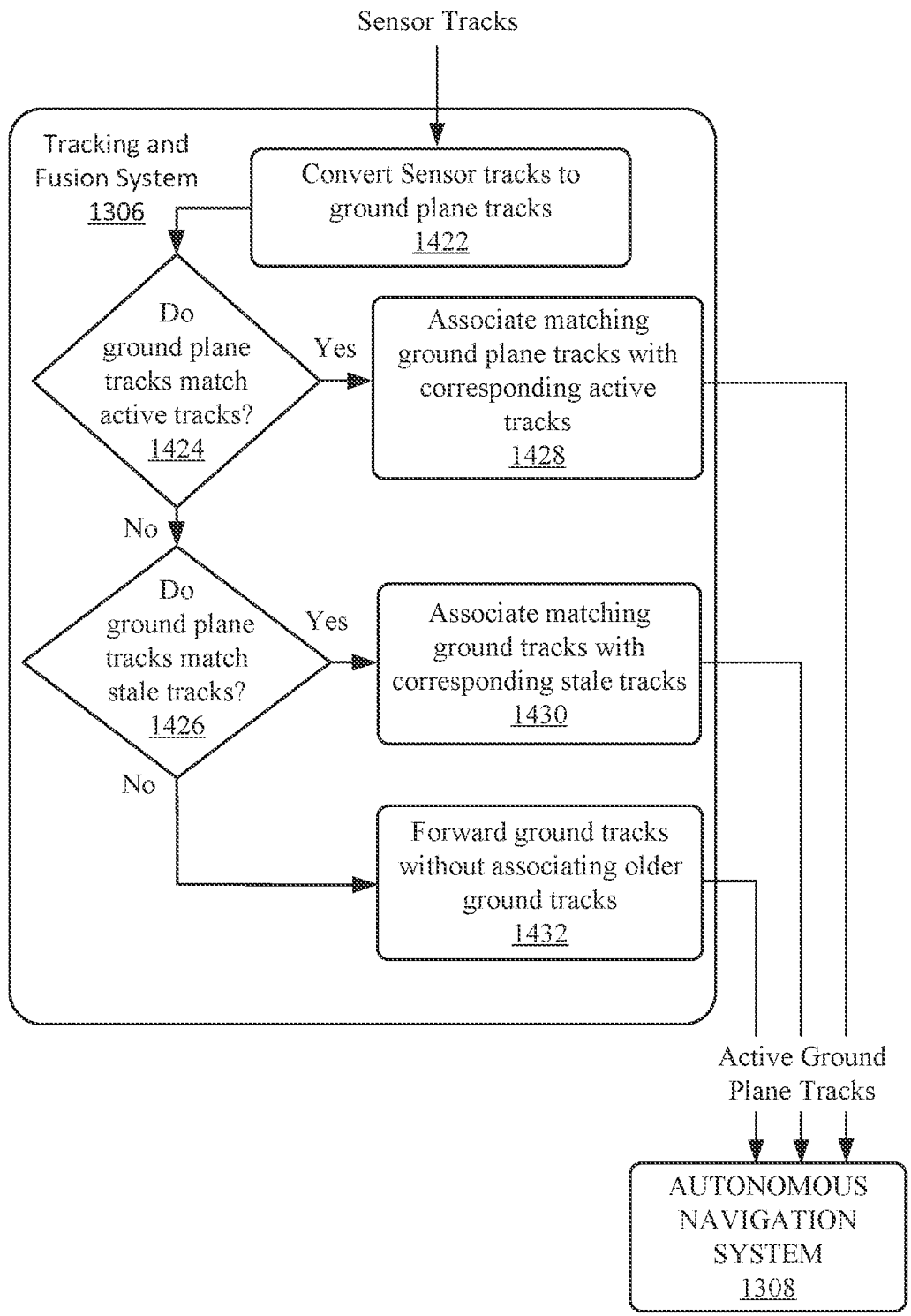

FIG. 14C shows a block diagram illustrating additional detail regarding a different specific implementation for the processing of sensor tracks by tracking and fusion system 1306. In particular, FIG. 14C illustrates how tracking and fusion system 1306 combines newly gathered tracking data with historical tracking data instead of tracker 1304 as described in preceding FIGS. 14A-14B. At 1422, tracking and fusion system 1306 is configured to convert new sensor tracks to ground plane tracks as previously described in the text accompanying FIG. 13. At 1424 and 1426, the new ground plane tracks are compared with older active and stale tracks, respectively. Stale tracks are those tracks that have not yet been deleted for being too old and/or unreliable but also fail to meet an active track classification criteria. Active and stale-track criteria are generally distinguished from one another based on factors such as tracking data age, object position with respect to the autonomous vehicle and tracking data confidence. For example, a track could be considered to be an active track when tracking data has been updated within a threshold period of time and/or is assigned a threshold tracking data confidence level based on the position and/or direction of travel of the object associated with the track. The stale-track criteria can also be based at least in part on a number of image frames captured without detection of the object. In some embodiments, tracking data confidence level can also be based on a temporal consistency of the data making up the tracking data.

In particular, at 1424, newly converted ground plane tracks are compared with active tracks. The new ground plane tracks that meet a matching criteria with an older active track are fused with the matching active track at 1428 to form a single updated active track. In some embodiments, the tracking data from the older active track is fused with tracking data from the new track by changing a track ID of the new tracking data to a track ID of the older active track. In this way, the sensor data associated with the new ground plane track can be combined with the older tracking data so that autonomous navigation system 1308 is able to use both current and historical data to more easily predict future movement of the object. In some embodiments, a track ID of tracking data associated with the older active track can be changed to have the track ID associated with the new tracking data. Matching criteria between the new tracking data and old tracking data can vary based on the operating conditions of the autonomous vehicle but is based generally on the new ground plane tracks being proximate to an expected or projected location of the object based on the historical tracking data associated with the active tracks.

Tracking and fusion system 1306 can optionally include at 1426, a process in which remaining unmatched ground plane tracks are compared with older tracks having a stale status. This allows some objects that may have been temporarily obscured by another object, sun glare, illumination variation due to shadowing/clouds, or the like to be re-identified. At 1430, the unmatched ground plane tracks that meet a matching criteria with one of the older stale tracks are fused with data from the stale track to generate a single updated active track that is forwarded on to autonomous navigation system 1308. In this way, the new sensor data can be combined with the older tracking data so that autonomous navigation system 1308 is able to use both current and historical data to better predict future movement of the object. Matching criteria can vary based on the operating conditions of the autonomous vehicle but is based generally on a new ground plane track being located near an expected location of the object based on historical ground plane tracks. It should be noted that matching stale tracks can be more problematic to perform reliably since the stale tracks typically have gone without update for at least a short period of time making reliable prediction more difficult. Consequently, the matching criteria for fusion of current tracks with older stale tracks can be configured more conservatively than the matching criteria for active tracks to avoid mismatching. In this way, the new sensor data can be reliably combined with the older tracking data so that autonomous navigation system 1308 is able to use both current and historical data to more easily predict future behavior of the object in situations in which one or more of the objects goes undetected for brief periods of time.

When there are new ground plane tracks that do not match any of the older active or stale tracks, at 1432, the unmatched ground plane tracks can be forwarded on to autonomous navigation system 1308 without any historical tracking data for use in predicting behavior to assist with navigating the autonomous vehicle.

Figure 15:
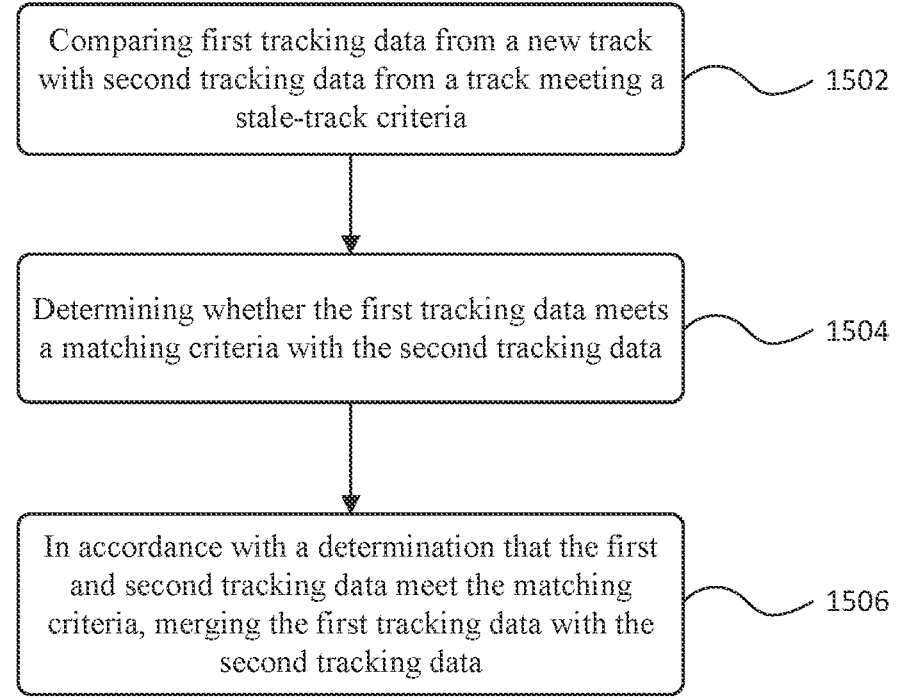
FIG. 15 shows a flow chart of the process described generally in reference to a block of FIG. 14B.

FIG. 15 shows a flow chart illustrating a method for associating a newly detected object with a track meeting a stale track criteria, described generally at block 1408 of FIG. 14B. At 1502, a new sensor track that includes first tracking data, not having already been associated with an active track, is compared with second tracking data that is included in a track meeting a stale-track criteria by a processing circuit executing instructions stored on a storage medium (e.g., main memory 306 or storage device 310). It should be noted that the active and stale track matching processes performed at block 1408 can also be performed concurrently, in which case even the new sensor tracks eventually associated with an active track would also be compared against tracks meeting a stale-track criteria prior to a final correlation being made. At 1504, the comparison of the first and second tracking data can be used by the processing circuit to determine whether the first and second tracking data share similar features sufficient to meet a matching criteria. In some embodiments the matching criteria can be used to determine whether differences in the tracking data associated with the new sensor track and stale track are consistent with a period of time that has elapsed between a time of collection of the most recent data associated with the stale track and the tracking data used to generate the new sensor track.

At 1506, tracking data from the matching tracks can be merged together to create an updated active sensor track containing the information from both the first and second tracking data. In some embodiments, a predicted position of the object generated from tracking data of the stale track can be combined with the detected position of the object from the new sensor track to improve the accuracy of the object. This type of combination would typically be performed when the stale track had just recently become stale and/or where due to the object detection system tracking multiple objects, obscuration of the object by another tracked object was expected to occur and variation between the detected position and predicted position are within expected tolerances. After merging the tracking data into an active sensor track, the sensor track is forwarded on to detection and tracking system 1306 where the active sensor track is converted to a ground plane track and then provided to the autonomous navigation system 1308, which allows a control circuit to use the tracking data included in the ground plane track to navigate the autonomous vehicle. In some embodiments, the tracking data from the ground plane track can be used to help the autonomous vehicle in avoiding the object associated with the updated active track. It should be appreciated that the method described in relation to FIG. 15 can also be applied to block 1430 from FIG. 14C with minor modification.

Figure 16A:
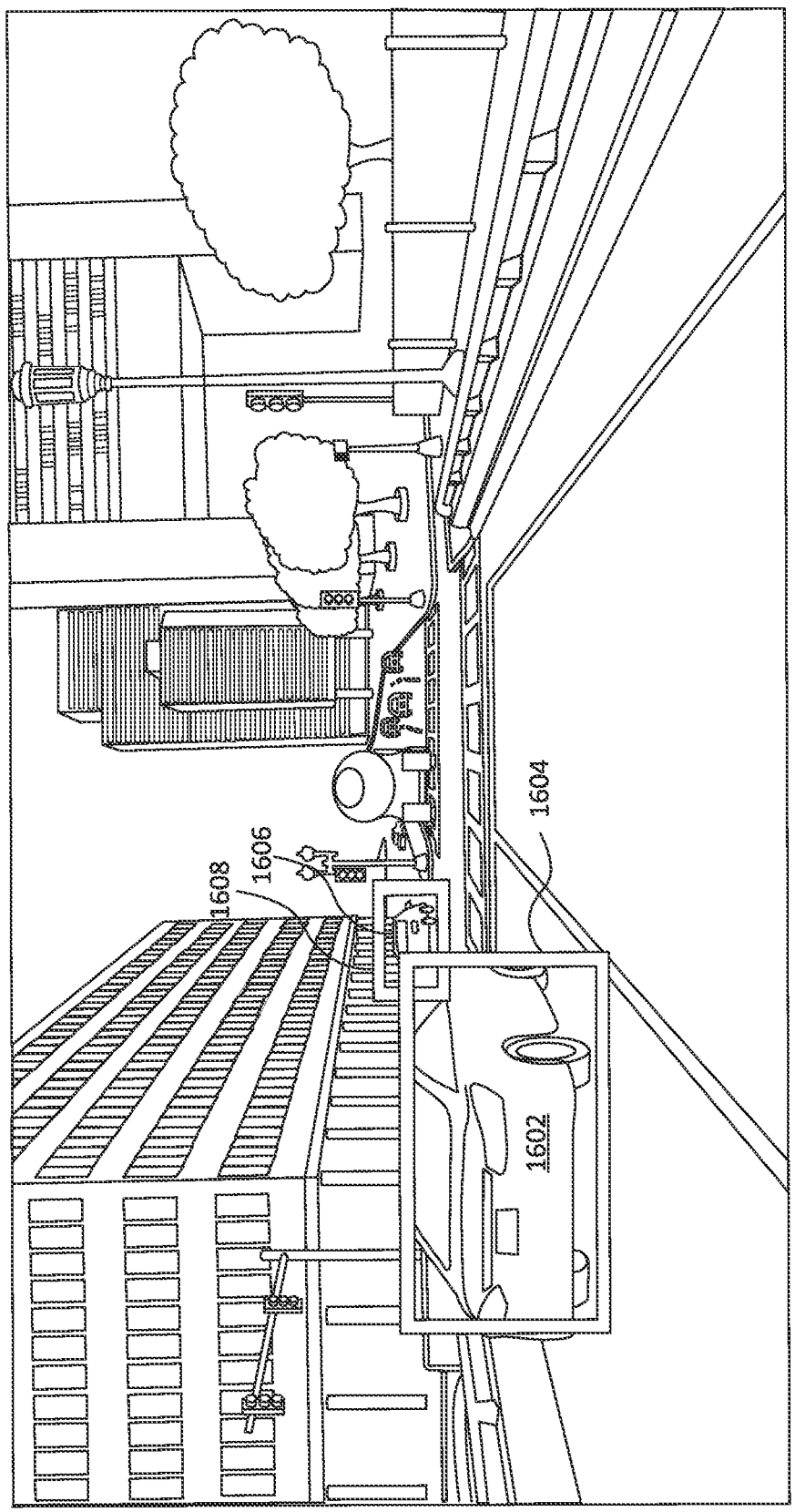
FIGS. 16A-16B show exemplary representations of images captured by an object detection system positioned aboard an autonomous vehicle as the autonomous vehicle approaches a traffic intersection.
Figure 16B:
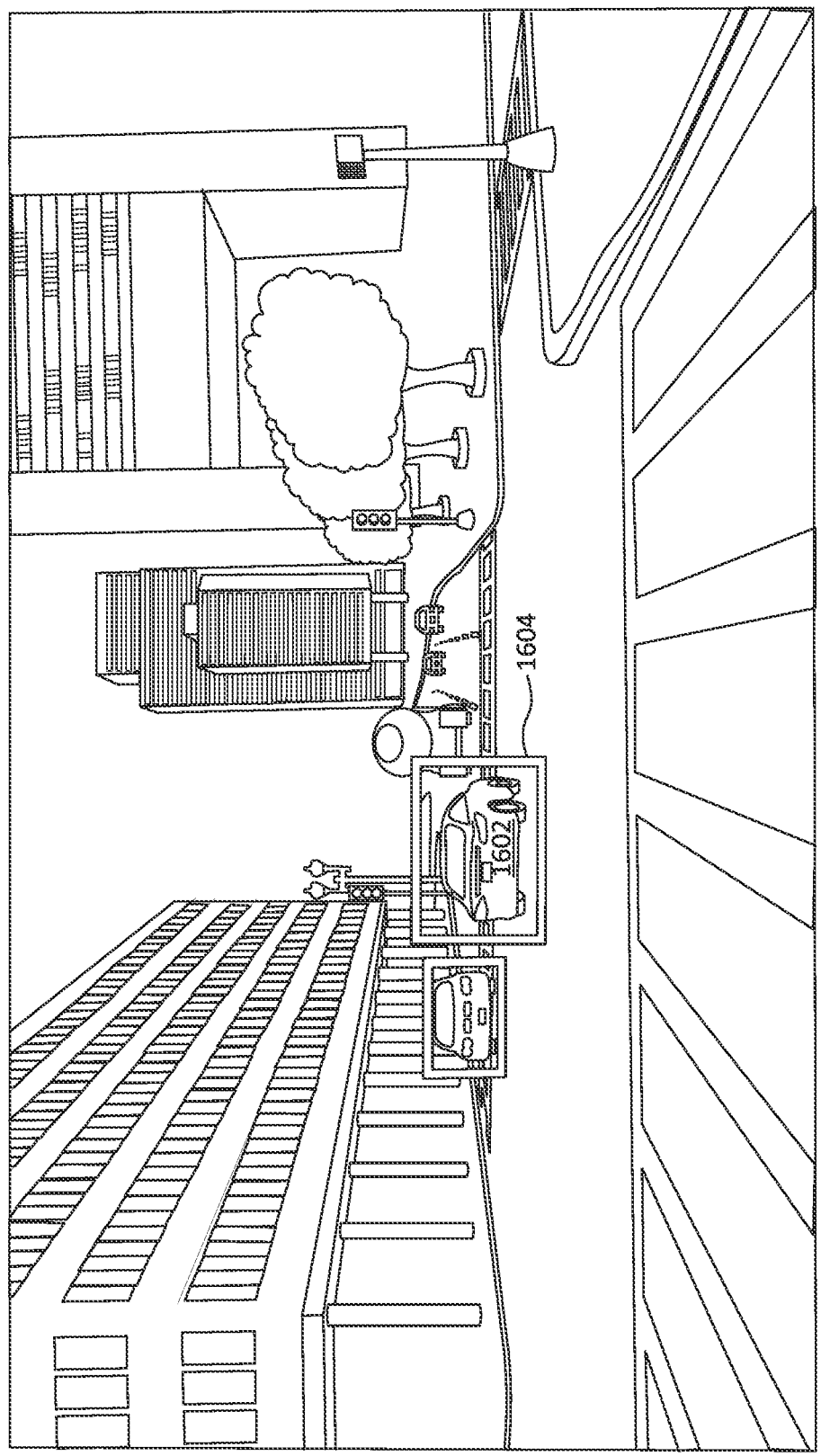

FIGS. 16A-16B show images captured by an object detection system positioned aboard an autonomous vehicle as it approaches a traffic intersection. In particular, FIG. 16A shows how vehicle 1602 is being tracked by the object detection system. A rectangular indicia 1604 indicates an active track being used to monitor the activity of vehicle 1602. The object detection system is also tracking vehicle 1606, which is shown by rectangular indicia 1608. While numerous other vehicles are shown in this scene, for purposes of clarity the movement of only vehicles 1602 and 1606 are discussed. Active tracks associated with both vehicles 1602 and 1606 can be well established at this point and include at least multiple seconds worth of tracking data.

FIG. 16B shows how vehicle 1606 re-emerges after passing behind vehicle 1602. When a vehicle is obscured in this manner a track associated with the vehicle can transition from an active track to a stale track in certain circumstances. In this particular example, because vehicle 1606 became obscured at the entry to an intersection, extrapolation of its movement became uncertain enough for the associated track to be marked as stale due to the uncertainty of its trajectory. For example, vehicle 1606 could proceed through the intersection, remain stopped at the intersection or begin turning right at the intersection while vehicle 1606 is obscured. While vehicle obscuration is one reason for the system to lose track of an object other factors can also result in the inability of the object detection system to keep track of a particular object. For example, sun glare could also prevent continuous tracking of vehicle 1606. Other reasons for tracking loss includes deformation of the object due to distortion inherent in the lens of the optical sensor that prevents the tracking system from continuing to consider the object being deformed by lens distortion from being the same object.

When vehicle 1606 re-emerges from out behind vehicle 1602, the fact that its position is consistent with one of its possible routes of travel (remaining stationary) and its color and shape are consistent with the color and shape seen in previously captured images, allows the object detection system to associate the position information of vehicle 1606 extrapolated from the image illustrated in FIG. 16B with tracking data gathered on vehicle 1606 prior to it being obscured by vehicle 1602. It should be appreciated from the depicted images shown in FIGS. 16A and 16B that in certain cases the changing background shapes behind vehicle 1606 can make certain identification of vehicle 1606 more difficult. In the depicted example, as vehicle 1602 proceeds through the traffic intersection, different portions of building would be positioned behind vehicle 1606 changing the background behind vehicle 1606. Where a certain vehicle feature was mistaken for a feature of the car this change could potentially affect the ability of the object identification system to re-associate old tracking data with vehicle 1606.

In some embodiments, activity of the traffic light captured by the object detection system or an independent traffic light detection system of the autonomous vehicle could also be considered in projecting movement of vehicle 1606. For example, once the former tracking data is re-identified with vehicle 1606, its stationary position at the intersection can make it much less likely that vehicle 1606 intends to make a right hand turn at an intersection where right hand turns on red signals are authorized. In this way, the object detection system could anticipate vehicle 1606 will continue to remain stationary at the intersection until the traffic light changes state at which point vehicle 1606 could proceed through the intersection or across the intersection with a left hand turn.

Figure 17A:
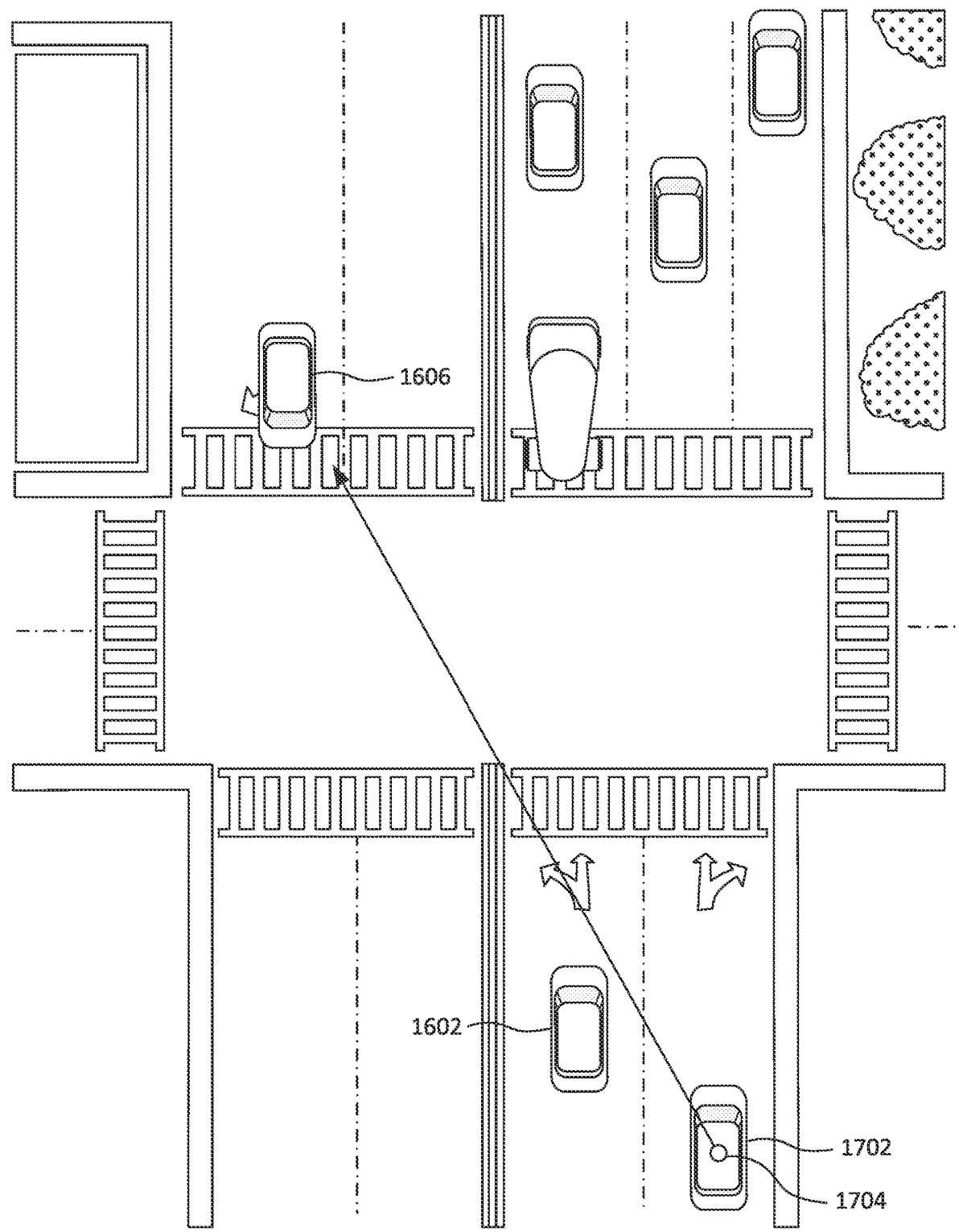
FIGS. 17A-17C depict a top view of the intersection depicted in FIGS. 16A-16B along with an autonomous vehicle and its object detection sensor.
Figure 17B:
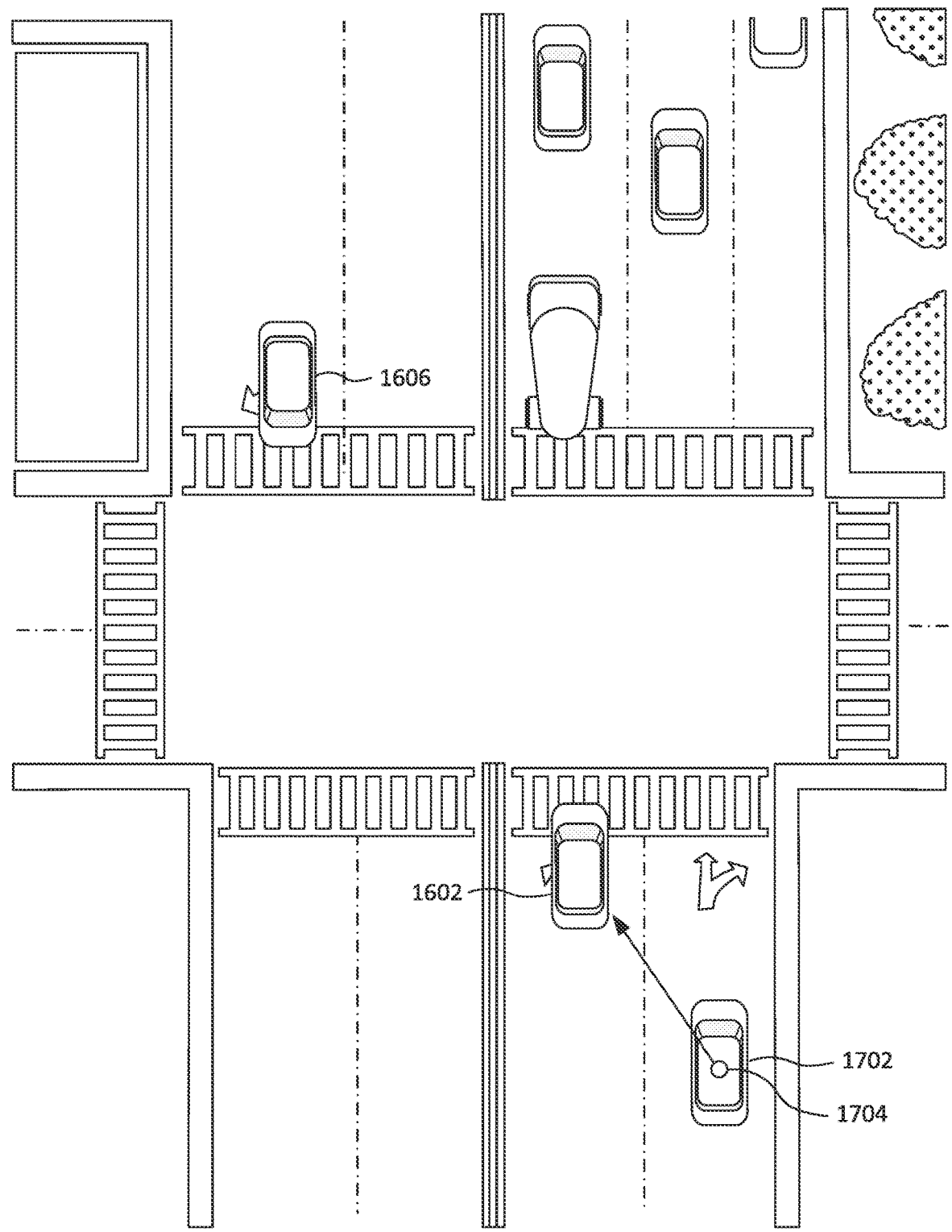
Figure 17C:
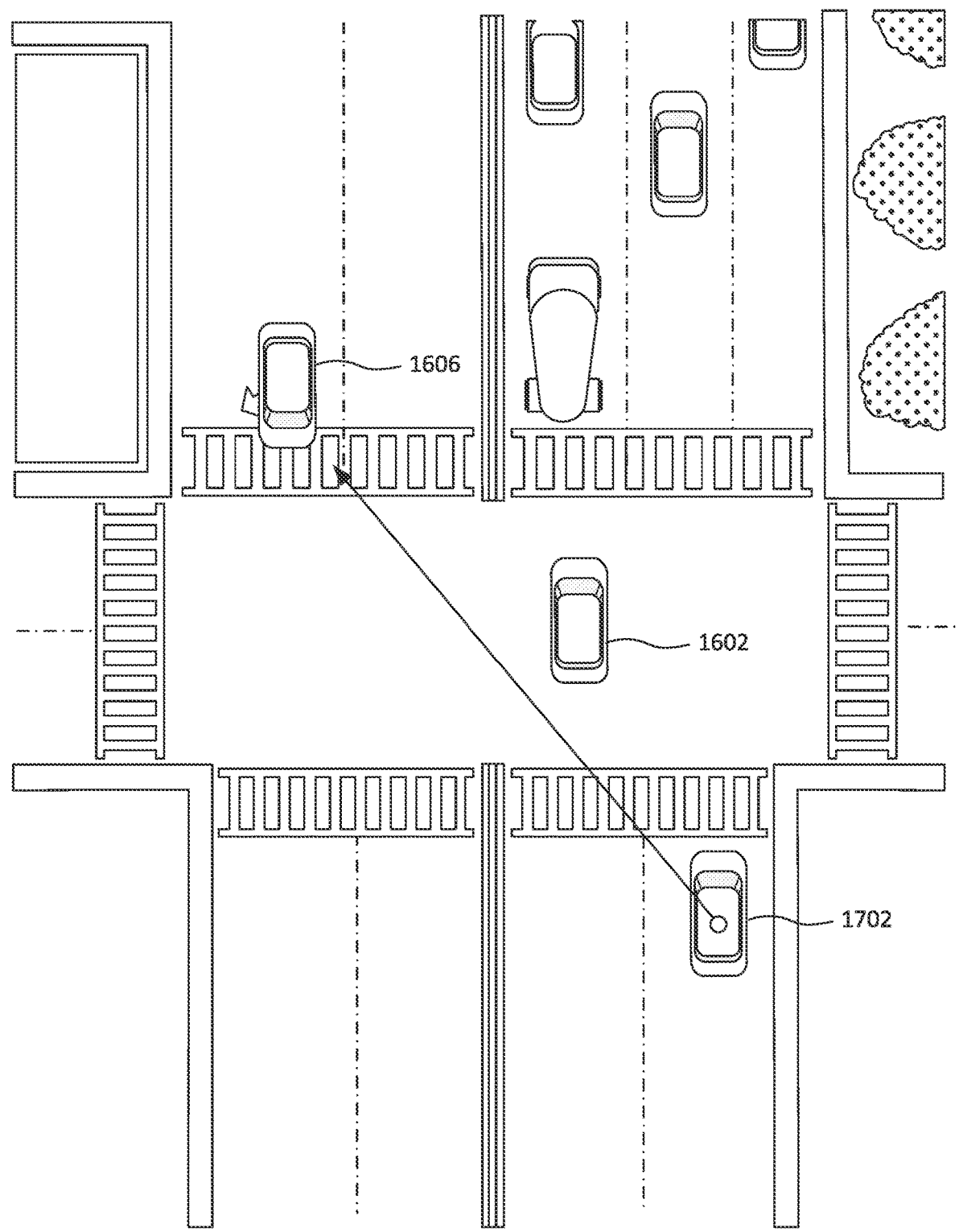

FIGS. 17A-17C depict a top view of the intersection depicted in FIGS. 16A-16B along with autonomous vehicle 1702 and optical sensor 1704. In particular, FIGS. 17A and 17C correspond to the images depicted in respective FIGS.

16A and 16B. As previously described, the position of vehicles 1602 and 1606 in the images illustrated in FIGS. 16A and 16B can be converted into ground plane tracks, as depicted in FIGS. 17A-17B. Conversion of the imagery data into location-based tracking data allows the autonomous vehicle to more accurately predict and avoid other objects it is tracking by correlating the position of the objects with map data. Fusion of the tracking data with map data allows for even more certainty as to direction, speed and likely behavior as the map includes information such as speed limit, number and position of lanes, position and operation of traffic signals, position of parking spaces and the like. For example, a vehicular object detected in a location known to be a parking spot can be presumed to be maintaining its position and be unlikely to move from its position.

FIG. 17B shows an intermediate position of vehicles between the images illustrated in FIGS. 16A and 16B. In particular, FIG. 17B shows how vehicle 1602 can obscure vehicle 1606 from view as vehicle 1602 pulls farther forward of autonomous vehicle 1702. This type of object obscuration can be referred to as object occlusion. As previously discussed, without a clear line of sight to vehicle 1606, the object detection system at this point can only guess as to what actions vehicle 1606 is taken while stopped. In FIG. 17C, vehicle 1602 no longer obscures a line of sight view of vehicle 1606 allowing the object detection system to reacquire vehicle 1606.

Figure 18:
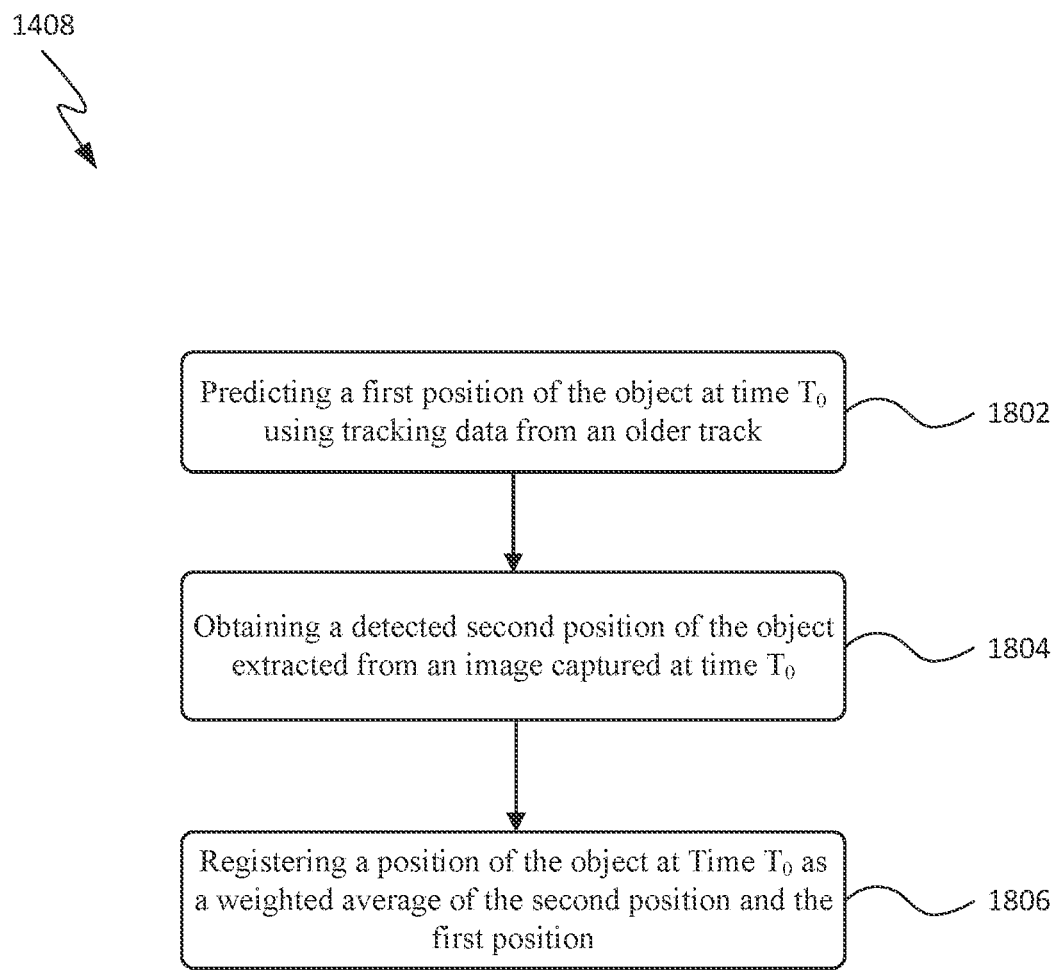
FIG. 18 shows a flow chart of a process described generally in reference to a block of FIG. 14A.

FIG. 18 shows a flow chart illustrating additional detail of the process performed and previously described in FIG. 14A at block 1408. In particular, associating the matching sensor tracks and active tracks includes at 1802, predicting a first position of the object at time $T_0$ using tracking data from the matching active track. Since the tracking data associated with the active track can include position data collected over the course of multiple frames, this predicted position can be more accurate than the detected position due to the potential for inaccuracies in the measurement of a single position. At 1804, a second position of the object extracted from the sensor data captured at time $T_0$ can be obtained from the tracking data making up the recently converted sensor track. At 1806, instead of registering the second position of the object as the position of the object at Time To, registering a position of the object at Time To as a weighted average of the second position and the first position. The weighting of this average can vary based on a number of factors including the consistency of the historical data, the quality of the sensor data captured at time $T_0$ and other factors affecting whether the predicted or detected position is considered likely to be more accurate of an actual position of the object at Time To. It should be noted that while the detection and tracking system described in FIG. 18 is effective that in alternative embodiments, new tracking data could include only the detected position without factoring in the predicted position prior to updating the tracking data for the ground plane track.

In the foregoing description, embodiments have been described with reference to numerous specific details that may vary from implementation to implementation. The description and drawings are, accordingly, to be regarded in an illustrative rather than a restrictive sense. The sole and exclusive indicator of the scope of the claims, and what is intended by the applicants to be the scope of the claims, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously-recited step or entity.

What is claimed is:

1. A method, comprising:
    capturing sensor data at a first time using a sensor of an autonomous vehicle;
    detecting, using a processing circuit, a first object from the sensor data, wherein detecting the first object includes creating detection data;
    generating, using the processing circuit, first tracking data associated with the first object based on the detection data;
    obtaining, using the processing circuit, second tracking data that meets a stale-track criteria, wherein the second tracking data corresponds to a second object detected using second data captured at a second time, wherein the second time is prior to the first time;
    determining a predicted position of the second object at the first time based on the second tracking data;
    determining that the first tracking data and the second tracking data satisfy matching criteria, wherein determining that the first tracking data and the second tracking data satisfy matching criteria comprises determining that the predicted position of the second object at the first time corresponds to a position of the first object at the first time; and
    in accordance with determining that the first tracking data and the second tracking data satisfy the matching criteria:
        associating, using the processing circuit, the second tracking data with the first tracking data; and
        navigating, using a control circuit, the autonomous vehicle based at least in part on the second tracking data.

2. The method of claim 1, wherein the detection data includes at least one of a detected range, range rate, angular position, or velocity.

3. The method of claim 1, wherein the first tracking data is assigned a first track ID.

4. The method of claim 3, wherein associating, using the processing circuit, the second tracking data with the first tracking data includes: assigning the first track ID to the second tracking data.

5. The method of claim 1, further comprising predicting a future position of the object based at least in part on the first tracking data and the second tracking data.

6. The method of claim 5, further comprising:
    capturing additional sensor data;
    generating new tracking data from the additional sensor data; and
    in accordance with a determination that the new tracking data includes a position of the
    object that corresponds to the predicted future position of the object, assigning a same track ID to the first tracking data and the new tracking data.

7. The method of claim 1, wherein the stale-track criteria is based at least in part on tracking data age.

8. The method of claim 7, wherein tracking data confidence of the second tracking data is based at least in part on a temporal consistency of the data making up the second tracking data.

9. The method of claim 1, wherein the first tracking data further comprises at least one of a velocity of the object, a shape of the object, a size of the object, a color of the object, or an orientation of the object.

10. The method of claim 1, wherein the second tracking data meets the stale-track criteria due to the occurrence of at least one of object occlusion, illumination variation, or deformation.

11. The method of claim, 1, wherein the sensor data includes imagery and creating the detection data includes extracting visual features from portions of the imagery that include the object.

12. The method of claim 1, wherein the sensor is a fixed focus imaging sensor.

13. The method of claim 1, wherein the sensor is one of a LiDAR sensor and a RADAR sensor.

14. The method of claim 1, wherein the tracking data is generated by at least one of a correlation filter tracker, a deep tracker, or a Kalman filter tracker.

15. The method of claim 1, wherein the stale-track criteria is met when the most recent data associated with the tracking data is older than a first threshold period of time.

16. The method of claim 15, further comprising:
in accordance with a determination that the most recent data associated with the tracking data is older than a second threshold period of time that is greater than the first threshold period of time, deleting tracking data categorized as being stale.

17. The method of claim 1, wherein the comparison meets the matching criteria when at least one of an object shape, size, or position included in the first tracking data matches a shape, size, or position included in the second tracking data.

18. The method of claim 17, wherein:
in accordance with a determination that differences in the first tracking data and the second tracking data are due to a change in orientation of the object with respect to the sensor, comparing the first tracking data to the second tracking data disregards the differences in the first tracking data and the second tracking data that are due to the change in orientation of the object with respect to the sensor.

19. A non-transitory computer-readable storage medium storing instructions configured to be executed by one or more circuits of a computing device that cause the computing device to carry out steps that include:
capturing sensor data at a first time using a sensor of an autonomous vehicle;
detecting, using a processing circuit, a first object from the sensor data, wherein detecting the first object includes creating detection data;
generating, using the processing circuit, first tracking data associated with the first object based on the detection data;
obtaining, using the processing circuit, second tracking data that meets a stale-track criteria, wherein the second tracking data corresponds to a second object detected using second data captured at a second time, wherein the second time is prior to the first time;
determining a predicted position of the second object at the first time based on the second tracking data;
determining that the first tracking data and the second tracking data satisfy matching criteria, wherein determining that the first tracking data and the second tracking data satisfy matching criteria comprises determining that the predicted position of the second object at the first time corresponds to a position of the first object at the first time; and
in accordance with determining that the first tracking data and the second tracking data satisfy the matching criteria:
associating, using the processing circuit, the second tracking data with the first tracking data; and
navigating, using a control circuit, the autonomous vehicle based at least in part on the second tracking data.

20. An autonomous vehicle, comprising:
a sensor;
a processing circuit;
a control circuit; and
memory storing one or more programs configured to be executed by the circuits of the autonomous vehicle, the one or more programs including instructions for:
capturing sensor data at a first time using the sensor;
detecting, using the processing circuit, a first object from the sensor data, wherein detecting the first object includes creating detection data;
generating, using the processing circuit, first tracking data associated with the first object based on the detection data;
obtaining, using the processing circuit, second tracking data that meets a staletrack criteria, wherein the second tracking data corresponds to a second object detected using second data captured at a second time, wherein the second time is prior to the first time;
determining a predicted position of the second object at the first time based on the second tracking data;
determining that the first tracking data and the second tracking data satisfy matching criteria, wherein determining that the first tracking data and the second tracking data satisfy matching criteria comprises determining that the predicted position of the second object at the first time corresponds to a position of the first object at the first time; and
in accordance with determining that the first tracking data and the second tracking data satisfy the matching criteria:
associating, using the processing circuit, the second tracking data with the first tracking data; and
navigating, using the control circuit, the autonomous vehicle based at least in part on the second tracking data.

* * * * *